United States Patent [19]
Kobayashi et al.

[11] Patent Number: 5,460,010
[45] Date of Patent: Oct. 24, 1995

[54] REFRIGERATOR

[75] Inventors: Akio Kobayashi, Osaka; Toshihide Hasegawa, Kyoto; Shinji Hara, Osaka; Yukinobu Nishikawa, Osaka; Tomoki Kawaguchi, Osaka, all of Japan

[73] Assignee: Sanyo Electric Co., Ltd., Osaka, Japan

[21] Appl. No.: 152,023

[22] Filed: Nov. 15, 1993

[30] Foreign Application Priority Data

Feb. 23, 1993 [JP] Japan .................................. 5-033242
Feb. 24, 1993 [JP] Japan .................................. 5-035550
Feb. 26, 1993 [JP] Japan .................................. 5-038543

[51] Int. Cl.$^6$ ................................................ F25D 17/06
[52] U.S. Cl. ................................ 62/187; 62/153; 62/154
[58] Field of Search .............................. 62/186, 187, 155, 62/153, 154, 234, 441, 442, 443, 444, 445, 446, 447

[56] References Cited

U.S. PATENT DOCUMENTS

| | | | |
|---|---|---|---|
| 3,839,878 | 10/1974 | Tilmanis | 62/156 X |
| 3,890,798 | 6/1975 | Fujimoto et al. | 62/155 |
| 4,299,095 | 11/1981 | Cassarino | 62/155 |
| 4,481,785 | 11/1984 | Tershak et al. | 62/153 |
| 4,569,206 | 2/1986 | Mitani et al. | 62/156 |
| 5,014,520 | 5/1991 | Omer et al. | 62/187 |

FOREIGN PATENT DOCUMENTS

| | | |
|---|---|---|
| 59-38506 | 9/1984 | Japan . |
| 3-7582 | 1/1991 | Japan . |
| 3-113258 | 5/1991 | Japan . |
| 3-267677 | 11/1991 | Japan . |
| 4-103984 | 4/1992 | Japan . |
| 4-121569 | 4/1992 | Japan . |
| 4-288466 | 10/1992 | Japan . |
| 5-632 | 1/1993 | Japan . |

*Primary Examiner*—Harry B. Tanner
*Attorney, Agent, or Firm*—Finnegan, Henderson, Farabow, Garrett & Dunner

[57] ABSTRACT

In a refrigerator, the inner space of a heat insulated housing is divided to form a refrigerating compartment, a freezer compartment, and a vegetable compartment. A projection which contacts with the back of a cooler cover and divides the space behind the cooler cover into two chambers arranged in a lateral direction is formed on a back wall portion. The space enclosed by the projection, the cooler cover, and the housing is formed as a cold air passage for guiding cold air of the refrigerating compartment to the vegetable compartment. A damper device has a shutter plate, a bias spring which urges the shutter plate toward a cold air duct, and a shape memorizing alloy coil spring on which a heater is wound. A weak current is always supplied from a damper control device to the heater so that the temperature of the shape memorizing alloy coil spring is maintained at the Ms point (martensite phase transition start temperature) or higher under the state where the shutter plate is lifted up. A defrosting control device for controlling the electric power supply to a defrosting heater has an operation integrating counter for integrating the operation time period of a compressor, converting means for converting the open/close frequency of doors into a time period, and a door-closure counter for measuring a time period of a door-closure state.

11 Claims, 16 Drawing Sheets

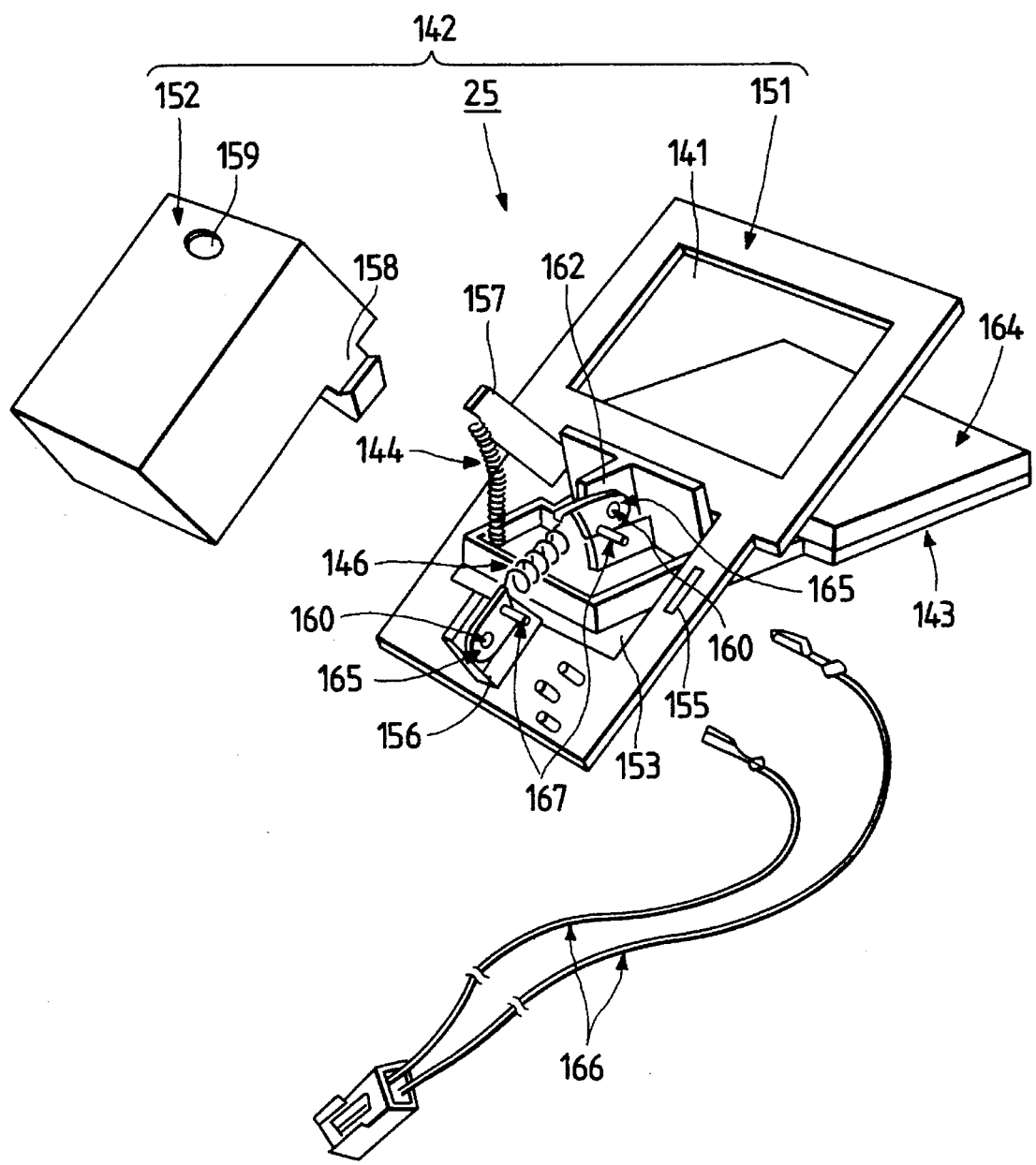

REFRIGERATOR

BACKGROUND OF THE INVENTION

1. Field of the Invention

The invention relates to a refrigerator which comprises a freezer compartment, a refrigerating compartment located over the freezer compartment, and a vegetable compartment located below the freezer compartment, and in which cold air is forcedly circulated into these compartments to cool their inner spaces. Moreover, the invention relates to a refrigerator having a damper device for controlling an inflow of cold air to a stock compartment and in which a shape memorizing alloy coil spring is used as a driver for the damper device, and a refrigerator having a defrosting control device for a refrigerator.

2. Description of Conventional Art

Unexamined Japanese Patent Publications (Kokai) HEI-3-267677, HEI-4-103984, and HEI-4-288466 disclose a refrigerator in which a refrigerating compartment is formed over a freezer compartment, and a vegetable compartment below the freezer compartment, and in which cold air cooled by a cooler is circulated into the freezer and refrigerating compartments. In the refrigerator, cold air supplied to the refrigerating compartment is guided to the vegetable compartment through a refrigerating compartment returning passage (feedback passage), and the cold air guided to the vegetable compartment is returned through a vegetable compartment returning passage (feedback passage) to a cooler chamber wherein a cooler is disposed. The refrigerating compartment returning passage (feedback passage) is formed by duct members in the back wall of a heat insulated housing.

A refrigerator of another type is disclosed in Post-examined Japanese Patent Publication (Kokoku) HEI-5-632. In the refrigerator, a stock compartment is divided by a partition into upper and lower compartments, each of the compartments is closed or opened by a drawer type door, and a plurality of containers are held in the stock compartment arranged so as to be vertically arranged and freely movable in the front-to-rear direction. In order to cool the inside of each container, a cold air supplying passage for guiding cold air to the stock compartment is provided with cold air guide ducts each functioning as a cold air passage directed to the corresponding container. In the refrigerator disclosed in the Publication HEI-5-632, one container can be drawn out from one of the stock compartments (in this case, a chilling temperature compartment) which are respectively provided with drawer type doors, by conducting an opening operation on the corresponding door. In a case where one chilling temperature compartment is provided with only one container because of capacity restrictions, there will not particularly arise a problem. In some cases, in the view point of the capacity, food may be stored more efficiently in one compartment when a plurality of containers are arranged in the vertical direction. In such cases, it is required to vertically arrange containers and form cold air guide ducts for respectively guiding cold air to all the containers.

In the refrigerator disclosed in the former three publications, the refrigerating compartment returning passage is located in the back wall (heat insulating material) of the heat insulated housing. In the process of assembling the heat insulated housing, therefore, the work of filling a foamed heat insulating material must be conducted under the state where the duct members are attached to an inner shell. This causes the number of parts including the duct members to be increased, and therefore it is troublesome to mount the duct members to the inner shell. Further, this produces another drawback that it is impossible to exchange the duct members with other ones after conducting the work of filling the foamed heat insulating material. The configuration in which the duct members are embedded in the heat insulating material has drawbacks that the heat insulating property of the back wall of the heat insulated housing is partially degraded, and that dewdrops are produced on the outer shell by heat conduction from the members of the duct through which cold air passes.

On the other hand, in the configuration disclosed in the latter publication wherein a plurality of cold air ducts for guiding cold air to the containers are formed, there arise drawbacks that the existence of the ducts reduces the capacity of the stock compartment, and that the number of parts and the manhour of mounting the ducts are increased as the number of ducts is increased, thereby raising the production cost.

A refrigerator having a freezer compartment and a refrigerating compartment, as mentioned above, is configured so that cold air which is cooled by a cooler in a cooler chamber is sent through a damper device and a cold air duct to the refrigerating compartment to cool its inner space. The damper device is disposed at the inlet of the cold air duct, and operates in such a manner that, when the temperature of the refrigerating compartment is raised to a temperature higher than an upper limit temperature, the opening portion of the damper device is opened to introduce cold air into the cold air duct, and that, when the temperature of the refrigerating compartment is lowered to a lower limit temperature or lower, the opening portion of the damper device is closed to halt the introduction of cold air. As the damper device, useful are dampers such as a gas filled damper thermostat, a motor-driven damper, and a shape memorizing damper which uses as a driver a coil spring of a shape memorizing alloy.

Such a shape memorizing damper is disclosed in, for example, Unexamined Japanese Utility Model Publication (Kokai) HEI-3-7582 and Unexamined Japanese Patent Publication (Kokai) HEI-3-113258. The damper devices disclosed in the publications comprise, as shown in FIG. 18, a damper baffle plate 1101 for opening and closing an opening communicated with a cold air duct through which cold air is sent from a cooler chamber to a refrigerating compartment, and a damper base 1102 which is fixed to the inside of the cold air duct and to which a rotation axis for opening and closing operation of the damper baffle plate is fixed. A heater 1104 is wound on a shape memorizing alloy coil spring 1103 having a helical shape as shown in FIG. 19 and an electrically insulated surface. A DC voltage $V_{cc}$ (for example, DC 12 V) is applied from a DC power source 1106 to the heater 1104, so that the shape memorizing alloy coil spring 1103 is directly heated by the heater 1104. The shape memorizing alloy coil spring 1103 generates a contraction force due to the shape memorizing effect that, when heated to the austenite phase transition terminate temperature Af (hereinafter, referred to as merely "Af point") or higher, the shape returns to its original one which has been memorized. In FIG. 18, ends of the shape memorizing alloy coil spring 1103 are hooked to the baffle plate 1101 and the damper base 1102, respectively. A bias spring 1105 is hooked to the baffle plate 1101 and the base 1102 in such a manner that the baffle plate is urged in the direction (i.e., the counter direction) opposite to that along which the baffle plate is rotated by the contraction force of the shape memorizing alloy coil spring 1103.

When the refrigerating compartment is to be cooled, the heater 1104 is supplied with a current to heat the shape memorizing alloy coil spring 1103 to the Af point or higher. This causes the shape memorizing alloy coil spring which, at the Af point or higher, has a contraction force greater than the urging force of the bias spring 1105, to contract. By the exerted contraction force, the baffle plate 1101 is lifted up to open the opening of the cold air duct (more specifically, of the damper base). This allows the cold air to enter from the cooler chamber to the refrigerating compartment to cool the inner space of the refrigerating compartment.

In contrast, when the cooling of the refrigerating compartment is to be stopped, the application of the DC voltage $V_{cc}$ is halted to stop the current supply to the heater 1104 so that the cold air in the vicinity of the damper device cools the shape memorizing alloy coil spring to the martensite phase transition terminate temperature Mf (hereinafter, referred to as merely "Mf point") or lower, thereby canceling or reducing the contraction force of the shape memorizing alloy coil spring. The urging force of the bias spring to pull down the damper baffle plate to close the opening of the cold air duct (more specifically, of the damper base). This causes the introduction of the cold air to be halted, thereby the cooling of the refrigerating compartment is stopped.

In the case where such a shape memorizing damper is to be used in a refrigerator, generally, it is necessary to guarantee that the damper device can operate 100,000 to 300,000 times or more. In other words, a damper device is required to have excellent heat cycle fatigue characteristics and repeating characteristics. Before using in a product, a fatigue test must be conducted under actual service conditions.

When an air blower is operated, moreover, the portion where a damper device is disposed is always exposed to cold air of about –20° to –25° C. Therefore, the following countermeasures are required to be taken. The material of the shape memorizing alloy coil spring is selected so that the lower limit temperature (i.e., the Mf point) for closing the baffle plate by cooling is set to be about –25° C. The quantity of heat applied to the shape memorizing alloy coil spring in order to actuate the baffle plate to the open state is set to be greater than the quantity of cooling attained by the cold air sent by the air blower. The upper limit temperature of the heating in the case of inverse transformation is set so as to be very higher than the preset temperature of the refrigerating compartment (when the Af point is 70° C., for example, the upper limit temperature is set to be 70° C. or higher). As a result of taking these countermeasures, the service temperature range of the shape memorizing alloy coil spring or that of the damper device is from about –25° C. to about 70° C.

In a cooling process wherein the hysteresis is great as shown in FIG. 11, generally, used is a shape memorizing alloy having characteristics in which transformation is conducted in two stages, the intermediate phase (so-called randhedral phase (hereinafter, referred to as merely "R phase"), and the martensite phase (hereinafter, referred to as merely "M phase") (particularly, an combination of an alloy having the R phase and a bias load (bias spring) is used). In this case, the phase transformation proceeds in the sequence of B2→ R → M → B2. A specific example of such an alloy which is usually used is a shape memorizing alloy (e.g., a TiNi alloy which does not undergoes an aging treatment) having a temperature zone in which the Af point is 70° C., the austenite phase transition start temperature As (hereinafter, referred to as merely "As point") is 53° C., the martensite phase transition start temperature Ms' in the R phase (referred to as merely "Ms' point") is 55° C., the martensite phase transition terminate temperature Mr' in the R phase (referred to as merely "Mf' point") is 46° C., the martensite phase transition start temperature Ms in the M phase (referred to as merely "Ms point") is 9° C., and the martensite phase transition terminate temperature Mf in the M phase (referred to as merely "Mf point") is in the vicinity of –18° C.

Such a prior art shape memorizing damper has several drawbacks. A first drawback is caused by the operation system of such a damper in which the heater 1104 is supplied with a current in the case of inverse transformation (namely, when the opening is to be opened), and the current supply to the heater 1104 is stopped in the case of transformation (namely, when the opening is to be closed). It is generally recognized in the art that the use of a shape memorizing alloy only in B2 → M and M → Bs transformation impairs the life of the alloy (i.e., the life of the alloy is short) and increases the degree of distortion. Experiments were conducted using such a prior art shape memorizing damper in a refrigerator manufactured by the assignee of the present application. The experimental results show that the stress (contraction force) generated when the shape memorizing alloy was heated to be inversely transformed to the parent phase was remarkably reduced after the operations of opening and closing the damper were repeated several thousands times, as compared with the initial value (the value obtained when the damper was used for the first time).

Next, a second drawback will be described. When a refrigerating compartment is to be cooled, the heater 1104 is supplied with a current to cause the shape memorizing alloy coil spring 1103 to be inversely transformed so that the damper baffle plate 1101 is lifted up by the contraction force due to the inverse transformation. Cold air of about –20° to –25° C. always contacts with the shape memorizing alloy coil spring 1103 and the heater 1104. Therefore, particularly in the heater 1104 which has a small heat capacity, the degree of heat loss is greater than that obtained in the case of windless. Accordingly, the setting of the resistance of the heater and the voltage to be applied to the heater is required to satisfy the condition that the heater generates a considerably large quantity of heat which is sufficient for heating the shape memorizing alloy in the cooled condition to the Af point (e.g., 70° C.) or higher at which the alloy undergoes inverse transformation. This results in that an excessive electric power is necessary as compared with that required in the case of windless. In the view point of power consumption, therefore, such a configuration has a problem in that the power is uselessly consumed. When the cooling of the refrigerating compartment is to be stopped, the current supply to the heater 1104 is stopped to cause the shape memorizing alloy coil spring 1103 to be transformed so that the damper baffle plate 1101 is shut down. In the case where the air blower is operated, the shape memorizing alloy is quickly cooled by circulating cold air, and therefore the damper baffle plate 1101 is rapidly shut down. By contrast, in the case where the air blower is not operated, cold air is not supplied, and therefore it is not possible to quickly cool the shape memorizing alloy, whereby producing a drawback that the damper baffle plate 1101 cannot rapidly be shut down.

Furthermore, in a refrigerator, the amount of frost formed on a cooler generally varies depending on the amount of food in the refrigerator and the frequency of putting food in and out (the frequency approximately equals to the open/close frequency of a door). When frost is formed so as to cover the entire surface of a cooler, the heat exchange capability of the cooler and the quantity of circulating cold air into the refrigerator are reduced. This degrades the cooling power of the refrigerator. For preventing such degradation from occurring, according to a conventional method, the operation of a compressor is stopped at intervals of a predetermined time period, and an electric power is supplied to a defrosting heater, thereby conducting the defrosting.

The defrosting start timing is determined by, for example, a method disclosed in Unexamined Japanese Patent Publication (Kokai) HEI-4-121569. In this method, the open/close frequency of the door is converted into a time period, and the obtained time period is added to the integrated operation time period of a compressor. When the resulting time period reaches or exceeds a certain time period, it is determined to start the defrosting. This method can advantageously prevent a waste defrosting by delaying the defrosting start timing in such a case where, in winter, the operation factor is low, the door is not so frequently opened and closed, and thus frost is not so formed on the cooler. In a defrosting control device disclosed in Postexamined Japanese Patent Publication (Kokoku) SHO- 59-38506, the open/close frequency of a door is integrated. When the integrated value reaches a defrosting start value, the defrosting is started. Then, a defrosting start value for the next time is determined on the basis of the time period required for completing the defrosting and the previous integrated value.

In a case where the defrosting start timing is determined only on the basis of the integrated operation time period of the compressor, the defrosting may be started when the door is opened. This makes a user distrustful, and may have a bad influence on the food stored in the refrigerator because of an abnormal temperature rise in the refrigerator which is caused by the fact that the cold air goes out of the refrigerator and the outside air goes into the refrigerator by opening the door, and additionally by the fact that the cooling operation is stopped.

Further, the defrosting timing determination method and the defrosting device disclosed in the above-identified publications have the following drawbacks. In a case where the door is opened and closed at an extremely high frequency, the defrosting may be started even when the compressor has operated only for a short time period. In addition, only the open/close frequency of the door is used as a main factor for determining the defrosting start timing. Accordingly, under an abnormal condition, the defrosting start timing is largely delayed from an appropriate timing, so that the food in the refrigerator goes bad. Such an abnormal condition includes, for example, a case where the humidity of the outside air is very high, a case where the door is opened for a longer time period than that required for putting the food in or out (i.e., the door is left open), and a case where a large amount of food which is not so cold is put in the refrigerator at a time.

SUMMARY OF THE INVENTION

In view of the above, it is an object of the invention to provide a refrigerator in which a duct is not embedded in a heat insulating material of a heat insulated housing, and a duct (cold air passage) is formed by an inner shell and a partition wall, and in which two containers are arranged in the vertical direction in a freezer compartment, and a part of cold air guided to one of the containers is guided to the other container by a simple structure. Moreover, upper and lower containers can be drawn out together by conducting an operation of drawing out a door of a freezer compartment.

Furthermore, it is another object of the invention to provide a refrigerator in which the current supply to a heater wound on a shape memorizing alloy coil spring is conducted in the manner opposite to that in the prior art, and, when a shutter plate is lifted up (i.e., in the cooling process), a weak current is always supplied to the heater so that the shape memorizing alloy coil spring is maintained at the Ms point or higher, thereby allowing the shape memorizing alloy coil spring to be used using only the R phase transformation (i.e., R→B2, B2→R transformation). Moreover, according to the invention, after a shutter plate is shut down during the heating process, the duty factor of a heater is reduced so that the temperature of a shape memorizing alloy coil spring is prevented from being excessively raised to greatly exceed the Af point, whereby the degree of the temperature drop which should be accomplished for the cooling operation can be reduced.

Still further, it is the other object of the invention to provide a refrigerator having a defrosting control device, which eliminates the disadvantage that the defrosting start interval is abnormally short and therefore the defrosting is conducted even a condition that almost no frost is formed on the cooler, and which determines the defrosting start timing so that the defrosting can be immediately started when an abnormal condition is once occurred.

According to the first aspect of the invention, the refrigerator comprises: a heat insulated housing which opens at a front and consists of an inner shell, an outer shell, and a foamed heat insulating material which is filled between the inner and outer shells; two horizontal partitions for dividing the inner space of the heat insulated housing into three sections which are respectively formed as a refrigerating compartment, a freezer compartment, and a vegetable compartment arranged in this sequence in the vertical direction; and a partition plate which is separated from a portion of the inner shell corresponding to the freezer compartment, a cooler chamber for accommodating a cooler being formed between the partition plate and the inner shell, cold air cooled by the cooler being circulated into the refrigerating compartment and the freezer compartment, wherein the refrigerator further comprises a projection, formed on a back wall of the inner shell corresponding to the freezer compartment and contacting with the back of the partition plate, for dividing a space behind the partition plate in two chambers arranged in a lateral direction, a space defined by the projection, the partition plate, and the inner shell functioning as a cold air passage which communicates with the refrigerating compartment and the vegetable compartment, cold air in the refrigerating compartment being guided to the vegetable compartment through the cold air passage.

Furthermore, a refrigerator comprises: a heat insulated housing which opens at a front and consists of an inner shell, an outer shell, and a foamed heat insulating material which is filled between the inner and outer shells; two horizontal partitions for dividing the inner space of the heat insulated housing into three sections which are respectively formed as a refrigerating compartment, a freezer compartment, and a vegetable compartment arranged in this sequence in the vertical direction; and a partition plate which is separated from a portion of the inner shell corresponding to the freezer compartment, a cooler chamber for accommodating a cooler being formed between the partition plate and the inner shell, wherein the refrigerator further comprises: a rail, formed on a side wall of the inner shell corresponding to the freezer compartment, for supporting an upper container in such a manner that the upper container is movable in the front-to-rear direction, the upper container opening at an upper face; and a small-food container which is made of metal and detachably placed on the upper container, the upper container being provided at a rear portion with an inlet opening, and at a lower face with an outlet opening, the partition plate being provided at a location opposing the inlet opening with a cold air outlet opening, a cold air passage being formed by the small-food container and the upper container, the cold air passage elongating from the inlet opening to the outlet opening.

Moreover, a refrigerator comprises: a heat insulated housing which opens at a front and consists of an inner shell, an outer shell, and a foamed heat insulating material which is filled between the inner and outer shells; two horizontal partitions for dividing the inner space of the heat insulated housing into three sections which are respectively formed as a refrigerating compartment, a freezer compartment, and a vegetable compartment arranged in this sequence in the vertical direction; and a partition plate which is separated from a portion of the inner shell corresponding to the freezer compartment, a cooler chamber for accommodating a cooler being formed between the partition plate and the inner shell, wherein the refrigerator further comprises: a rail, formed on a side wall of the inner shell corresponding to the freezer compartment, for supporting an upper container in such a manner that the upper container is movable in the front-to-rear direction, the upper container opening at an upper face; an ice tray which opens at an upper face and is detachably supported by the upper container; and a lid for closing the opening of the ice tray, the upper container being provided at a rear portion with an inlet opening, and at an upper portion with a finger insertion opening, the partition plate being provided at a location opposing the inlet opening with a cold air outlet opening, a cold air passage being formed by the ice tray and the upper container, the cold air passage elongating from the inlet opening to the finger insertion opening.

Still further, a refrigerator comprises: a heat insulated housing which opens at a front and consists of an inner shell, an outer shell, and a foamed heat insulating material which is filled between the inner and outer shells; two horizontal partitions for dividing the inner space of the heat insulated housing into three sections which are respectively formed as a refrigerating compartment, a freezer compartment, and a vegetable compartment arranged in this sequence in the vertical direction; a partition plate which is separated from a portion of the inner shell corresponding to the freezer compartment, a cooler chamber for accommodating a cooler being formed between the partition plate and the inner shell; and a drawer type door for closing an opening of the freezer compartment, wherein the refrigerator further comprises: a lower container which is disposed behind the door and opens at an upper face; a rail which is formed on a side wall of the inner shell corresponding to the freezer compartment, the rail elongating in the front-to-rear direction; and an upper container which is supported by the rail in such a manner that the upper container is movable in the front-to-rear direction, the upper container opening at an upper face, a projection being formed on a lower face of the upper container, and an engaging portion being formed in an upper portion of the lower container, the engaging portion being engaged with the projection when the door is drawn out by a predetermined distance.

According to the first aspect of the invention, the cold air passage for guiding cold air of the refrigerating compartment to the vegetable compartment can be formed by using the projection of the back wall of the inner shell corresponding to the freezer compartment, the partition plate for forming the cooler chamber, and the inner shell. Accordingly, it is not required to use special parts for forming the cold air passage, and to conduct the work of mounting ducts on the back wall of the heat insulated housing. Further, it is possible to suppress the degradation of the heat insulating property of the heat insulated housing.

Furthermore, the cold air passage elongating from the inlet opening of the upper container to the outlet opening can be formed by using a space formed between the upper container and the small-food container which is made of metal and detachably placed on the upper container. This eliminates the necessity of providing special ducts for forming the cold air passage, and enables the lower container to be supplied with cold air from the outlet opening of the upper container. Accordingly, a duct dedicated to guiding cold air to the lower container is not required, whereby the number of parts can be reduced.

Moreover, the cold air passage elongating from the inlet opening of the upper container to the finger insertion opening can be formed by using a space formed between the upper container and the ice tray which opens at an upper face and detachably placed on the upper container. This eliminates the necessity of providing special ducts for forming the cold air passage. Since the ice tray is covered by the lid and cold air cools the lower face of the ice tray, the transparency of produced ice can be enhanced. Further, cold air can be supplied through the finger insertion opening, to the upper face of the upper container and also to the lower container. Accordingly, a guide duct for the upper face of the upper container and a duct dedicated to guiding cold air to the lower container are not required, whereby the number of parts can be reduced.

Still further, a projection is formed on a lower face of the upper container, and an engaging portion is formed in an upper portion of the lower container so that the engaging portion is engaged with the projection when the door of the freezer compartment is drawn out by a predetermined distance. Only the lower container can be drawn out until the door of the freezer compartment is drawn out by the predetermined distance. When the door is further drawn out, the engaging portion of the lower container engages with the projection of the upper portion so that both the upper and lower containers are drawn out together.

According to the second aspect of the invention, the refrigerator comprises: a cold air duct for guiding cold air which is cooled by a cooler, to a stock compartment; a damper device for controlling an inflow of cold air to the cold air duct; and a damper control device for controlling the operation of the damper device, wherein the damper device comprises: a case having an opening which communicates with the cold air duct; a shutter plate, rotatably and pivotally supported by the case, for opening and closing the opening; a bias spring for urging the shutter plate toward the opening direction; and a shape memorizing alloy coil spring on which a heater is wound and which, when heated to the austenite phase transition terminate temperature or higher, is restored to the original shape to cause the shutter plate to close the opening against the urging force of the bias spring, the damper control device supplying a current to the heater in order to cause the shutter plate to close the opening.

Furthermore, a refrigerator comprises: a cold air duct for guiding cold air which is cooled by a cooler, to a stock compartment; a damper device for controlling an inflow of cold air to the cold air duct; and a damper control device for controlling the operation of the damper device, wherein the damper device comprises: a case having an opening which communicates with the cold air duct; a shutter plate, rotatably and pivotally supported by the case, for opening and closing the opening; a bias spring for urging the shutter plate toward the opening direction; and a shape memorizing alloy coil spring, on which a heater is wound and which, when heated to the austenite phase transition terminate temperature or higher, is restored to the original shape to cause the shutter plate to close the opening against the urging force of the bias spring, the damper control device supplying a current to the heater in order to cause the shutter plate to close the opening, and always supplying a weak current to the heater so as to maintain the temperature of the shape memorizing alloy coil spring at the martensite phase transition start temperature or higher when the shutter plate is in the open state.

In the invention, as a driver for the damper device, used is a combination of a shape memorizing alloy coil spring which exhibits two-stage transformation in the course of cooling, or is transformed in the sequence of the parent phase (B2), the intermediate phase (R phase), and the martensite phase (M phase), and a bias spring which opposes the coil spring. According to the invention, a control method is provided in which, even after the opening and closing operations have been conducted 300,000 times, a force generated when the shape memorizing alloy is heated is not reduced as compared with the initial value. In the heating process, the heater is not supplied with a current in a degree higher than that needed, so as to reduce the power consumption. In the cooling process, in order to the shape memorizing alloy is rapidly transformed to the martensite phase, a weak current is supplied to the heater even during transformation so that the shape memorizing alloy coil spring is maintained at a temperature of the R phase transformation or the middle of transformation of the R phase to the M phase, thereby preventing the alloy from being cooled to a low temperature (i.e., the Mf point).

In the refrigerator of the second aspect of the invention, furthermore, the damper control device reduces the duty factor of the heater after the opening is closed by the shutter plate, so that the shape memorizing alloy coil spring is maintained at a temperature which is higher than the martensite phase transition start temperature of the R phase transformation and lower than the austenite phase transition terminate temperature.

According to the second aspect of the invention, a current is supplied to the heater when the shutter plate is to be shut down, and the current supply is stopped when the shutter plate is to be lifted up, whereby the opening and closing characteristics of the damper device is improved as compared with that of a prior art device.

Furthermore, a weak current is always supplied to the heater even in the state where the shutter plate is lifted up (or the shape memorizing alloy coil spring is cooled). Therefore, the shape memorizing alloy coil spring is maintained at a temperature of the R phase transformation or the middle of transformation of the R phase to the M phase. This causes the generated force and degree of distortion of the shape memorizing alloy to be less reduced with respect to the initial values even after the opening and closing operations of 300,000 times or more, resulting in that the durability of the damper device is remarkably enhanced. Moreover, since the current supply to the heater is conducted so that the heater generates heat of the minimum requirement, the responsibility of the opening and closing operation is improved.

Moreover, the duty factor of the heater is reduced after the opening is closed by the shutter plate (i.e., after the shape memorizing alloy coil spring is heated to the Af point or higher). This allows the shape memorizing alloy coil spring to be maintained at a temperature which is higher than the Ms point of the R phase transformation and lower than the Af point. Accordingly, the power consumption of the heater can be reduced, and the temperature drop characteristics in the cooling of the shape memorizing alloy coil spring can be improved as compared with that of the prior art.

According to the third aspect of the invention, a defrosting control device for a refrigerator and for controlling an electric power supply to a defrosting heater comprises a counter for integrating the operation time period of a compressor, and converting means for converting the open/close frequency of a door into a time period, and the defrosting control device determines a timing at which a defrosting of a cooler is started, on the basis of the operation time period of the compressor integrated by the counter, and the open/close time period of the door converted by the converting means, and supplies an electric power to the defrosting heater when the operation time period of the compressor reaches or exceeds a predetermined time period.

Furthermore, a defrosting control device for a refrigerator and for controlling an electric power supply to a defrosting heater comprises a counter for integrating the operation time period of a compressor, converting means for converting the open/close frequency of a door into a time period, and a door-closure counter for measuring a time period of a door-closure state, and the defrosting control device determines a timing at which a defrosting of a cooler is started, on the basis of the operation time period of the compressor integrated by the counter, and the open/close time period of the door converted by the converting means, and supplies an electric power to the defrosting heater when the door-closure time period measured by the door-closure counter reaches or exceeds a predetermined time period.

Moreover, a defrosting control device for a refrigerator and for turning on and off a compressor on the basis of a signal from a temperature sensing element which is provided in a freezer compartment and detects a temperature of the freezer compartment, and for terminating the defrosting for a cooler on the basis of a signal from another temperature sensing element which is attached to the cooler and detects a temperature of the cooler, and the defrosting control device supplies an electric power to a defrosting heater when a difference between temperatures detected by the temperature sensing elements exceeds a predetermined value.

Still further, a defrosting control device for a refrigerator and for turning on and off a compressor on the basis of a signal from a temperature sensing element which is provided in a freezer compartment and detects a temperature of the freezer compartment, and for terminating the defrosting for a cooler on the basis of a signal from another temperature sensing element which is attached to the cooler and detects a temperature of the cooler, the defrosting control device comprises a counter for measuring a continuous operation time period of the compressor, and supplies an electric power to a defrosting heater when the time period measured by the counter reaches or exceeds a predetermined time period and when a difference between temperatures detected by the temperature sensing elements exceeds a predetermined value.

Still further, a defrosting control device for a refrigerator and for turning on and off a compressor on the basis of a signal from a temperature sensing element which is provided in a freezer compartment and detects a temperature of the freezer compartment, and for terminating the defrosting for a cooler on the basis of a signal from another temperature sensing element which is attached to the cooler and detects a temperature of the cooler, the defrosting control device comprises: a continuous operation counter for measuring a continuous operation time period during which the compressor is continuously operated; and a door-closure counter for measuring a time period of a door-closure state, the defrosting control device supplies an electric power to a defrosting heater when the continuous operation time period measured by the continuous operation counter reaches or exceeds a predetermined time period, when the time period measured by the door-closure counter reaches or exceeds a predetermined time period, and when a difference between temperatures detected by the temperature sensing elements exceeds a predetermined value.

In other words, according to the third aspect of the invention, counters are provided for integrating an operation time period of the compressor, for converting the door open/close frequency into a time period, for integrating a continuous operation time period of the compressor, for integrating a time period of the door-closure state, and for integrating a time period after an emergency defrosting start temperature is detected, respectively. The defrosting start timing is determined on the basis of the signals from the respective counters, the signals from the temperature sensors located in the refrigerator and in the cooler, and the signals from the switches for detecting the open/close of doors.

According to the third aspect of the invention, the defrosting start timing of the cooler is determined in a prescribed manner on the basis of the integrated operation time period of the compressor and the open/close frequency of the door. Accordingly, the defrosting is not started if the integrated operation time period of the compressor does not reach or exceed a predetermined time period. As a result, a waste defrosting start can be avoided in a case where the open/close frequency of the door is extremely high but the operation factor of the compressor is low.

Furthermore, the defrosting start timing of the cooler is determined in a prescribed manner on the basis of the integrated operation time period of the compressor and the open/close frequency of the door. The defrosting is not started unless a predetermined time period elapses after the door is closed. Even in a case where the door is opened at the determined defrosting start timing, therefore, the defrosting is not started unlike the prior art in which the defrosting is started in such a case.

Moreover, if the difference between the temperature of the freezer compartment and the temperature of the cooler exceeds a predetermined value, it is judged that a frost obstruction of the cooler is formed, or an abnormal condition occurs. Therefore, the emergency defrosting can be started so that the degradation of the cooling power is eliminated in an early stage.

Still further, if the difference between the temperature of the freezer compartment and the temperature of the cooler exceeds a predetermined value and if the continuous operation time period of the compressor reaches or exceeds a predetermined time period, it is judged that a frost obstruction of the cooler is formed. Thus, it is possible to avoid erroneous judgment due to a temperature rise in the freezer compartment which temporarily occurs at the timing when the power is turned on or at the end of the defrosting. This enhances the judgment accuracy for the frost obstruction, and the occurrence of the abnormal condition can more surely be detected. As a result, the emergency defrosting can be started so that the degradation of the cooling power is eliminated in an early stage.

Still further, if the continuous operation time period of the compressor reaches or exceeds a predetermined time period and if the door-closure state continues for a predetermined period or longer time, it is judged that a frost obstruction of the cooler is formed. Thus, it is possible to avoid erroneous judgment due to a temperature rise in the freezer compartment which temporarily occurs for some reasons such as that the door is opened and closed, and that the food which is not so cold is put in the refrigerator. This enhances the judgment accuracy for the frost obstruction, and the occurrence of the abnormal condition can more surely be detected. As a result, the emergency defrosting can be started so that the degradation of the cooling power can be eliminated in an early stage. Unlike the prior art, furthermore, the defrosting cannot be started when the door is opened.

BRIEF DESCRIPTION OF THE DRAWINGS

FIG. 9 is an exploded perspective view of the damper device;

DETAILED DESCRIPTION OF PREFERRED EMBODIMENTS

Figure 1:
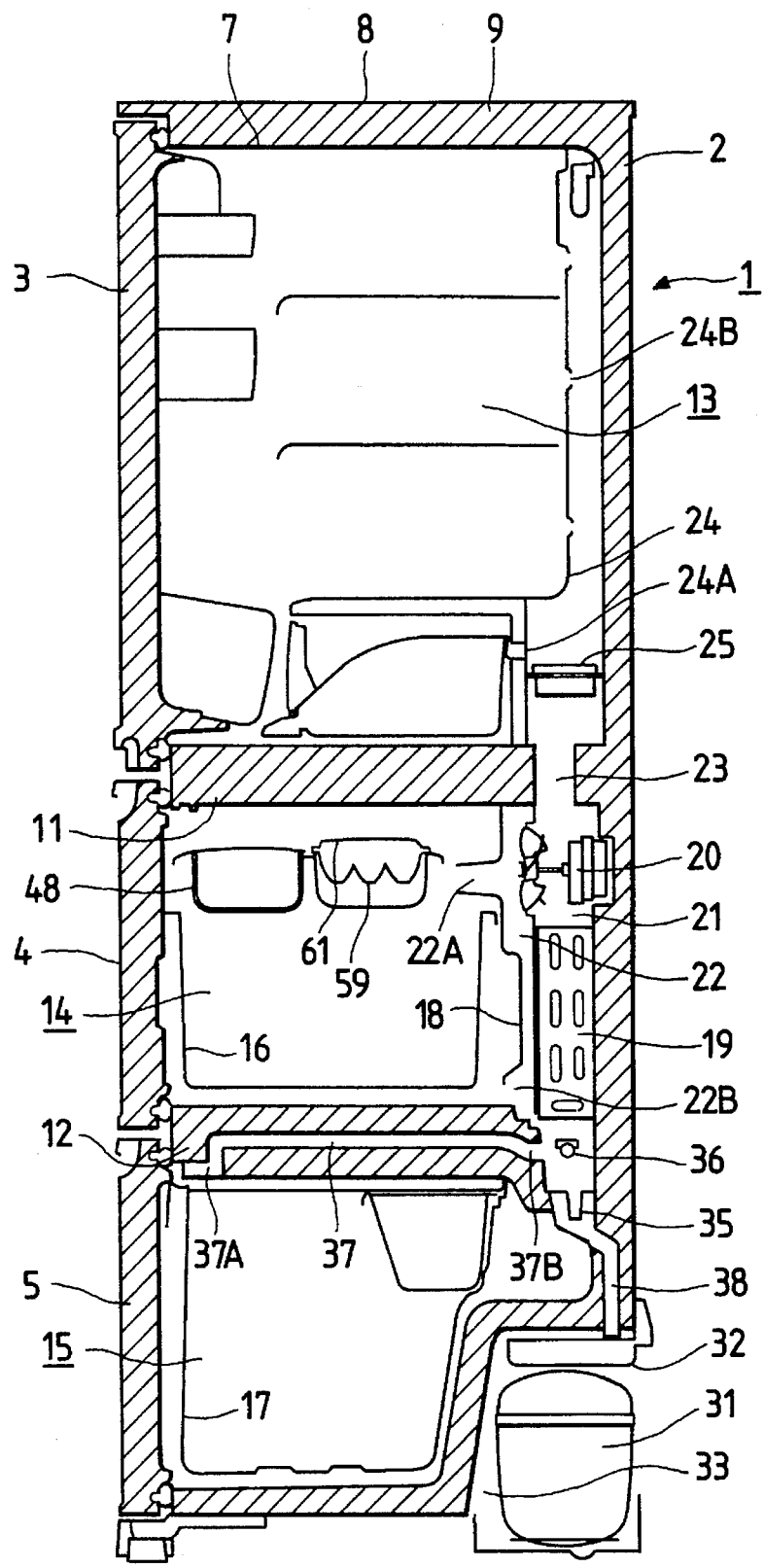
FIG. 1 is a longitudinal sectional side view of a refrigerator.
Figure 2:
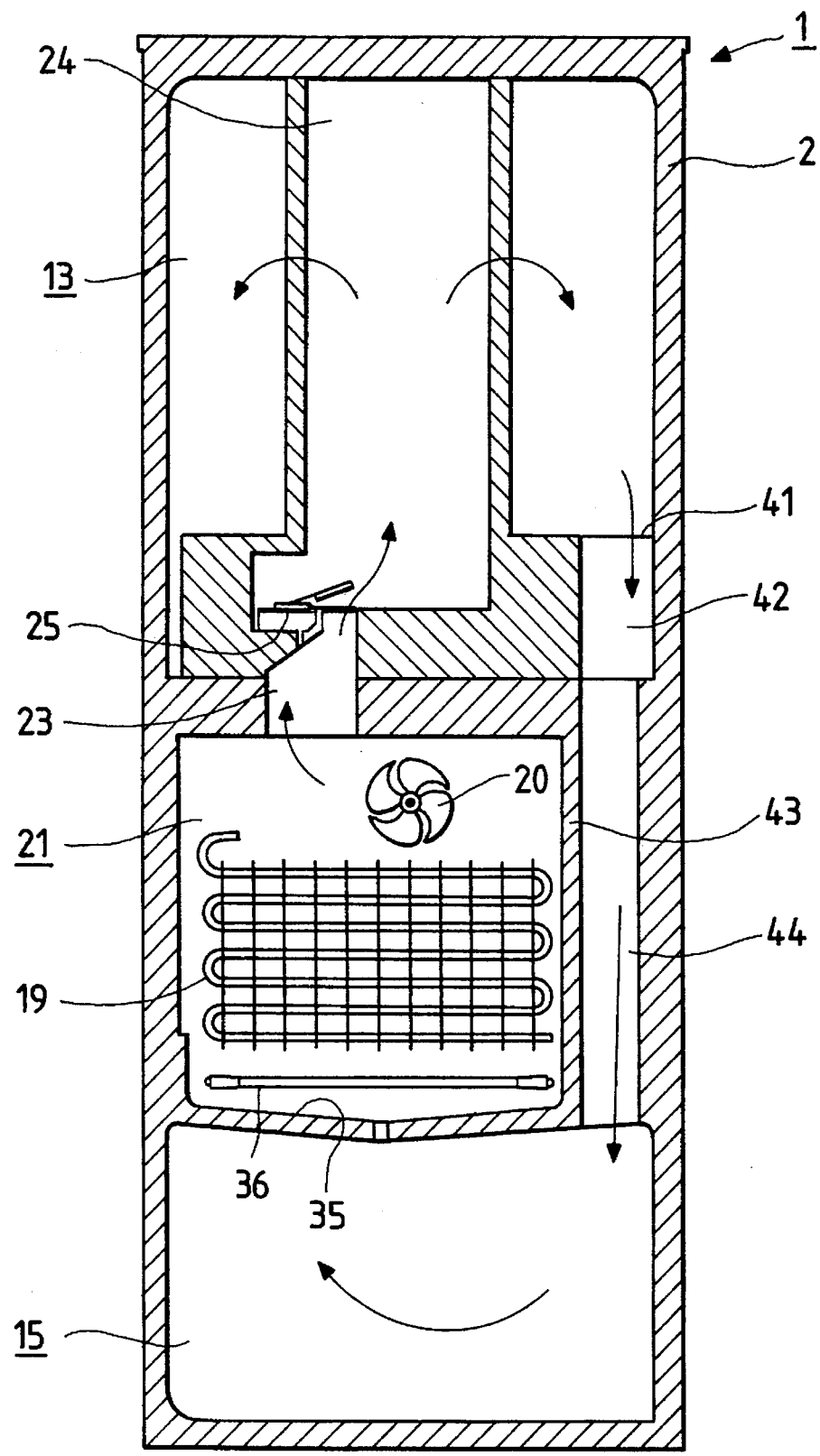
FIG. 2 is an enlarged longitudinal sectional front view showing the main portion and illustrating the cold air circulation into a refrigerating compartment and a vegetable compartment according to the invention.
Figure 3:
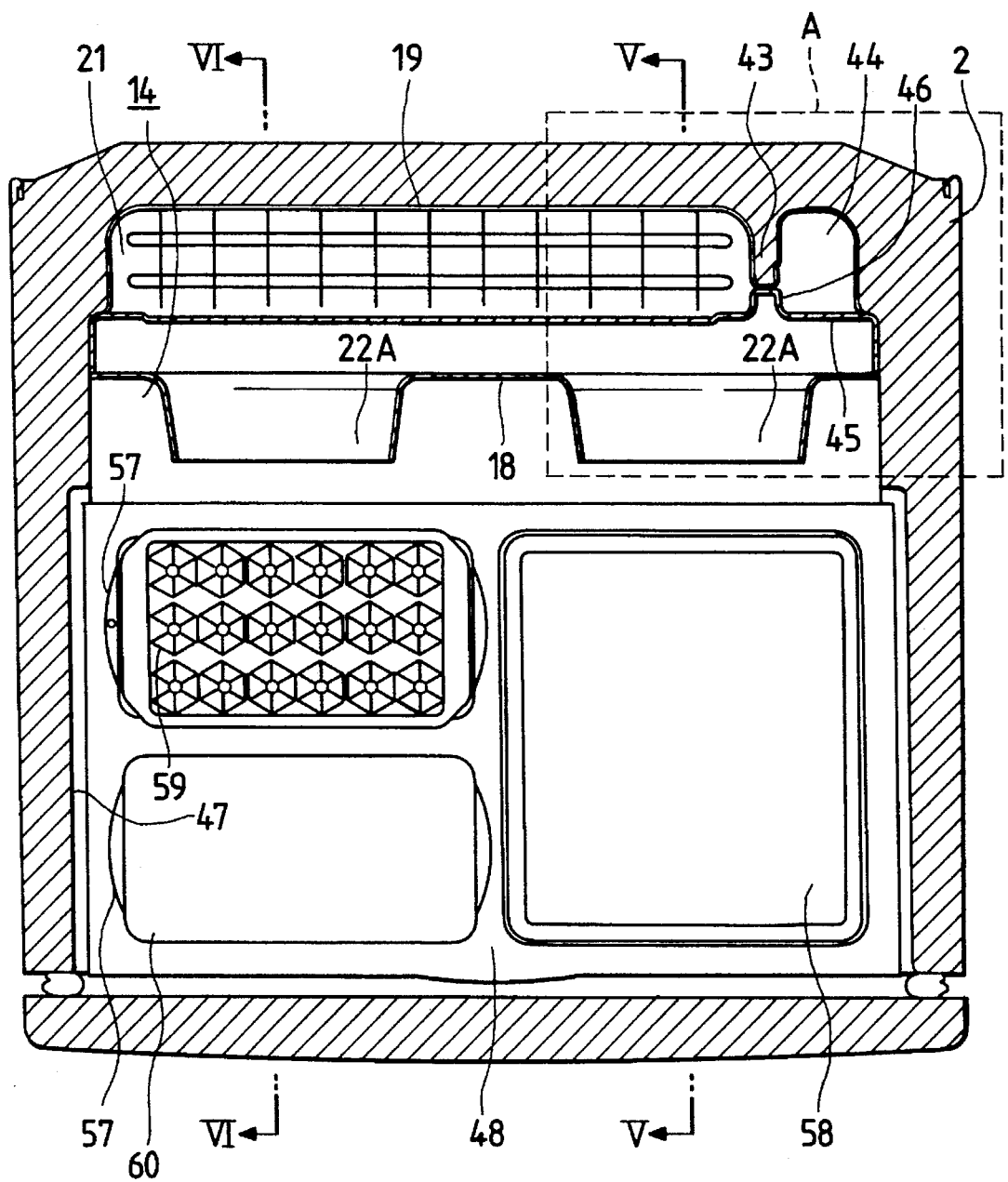
FIG. 3 is a cross section view showing a section obtained when an upper container of a freezer compartment is horizontally cut at its upper portion.
Figure 4:
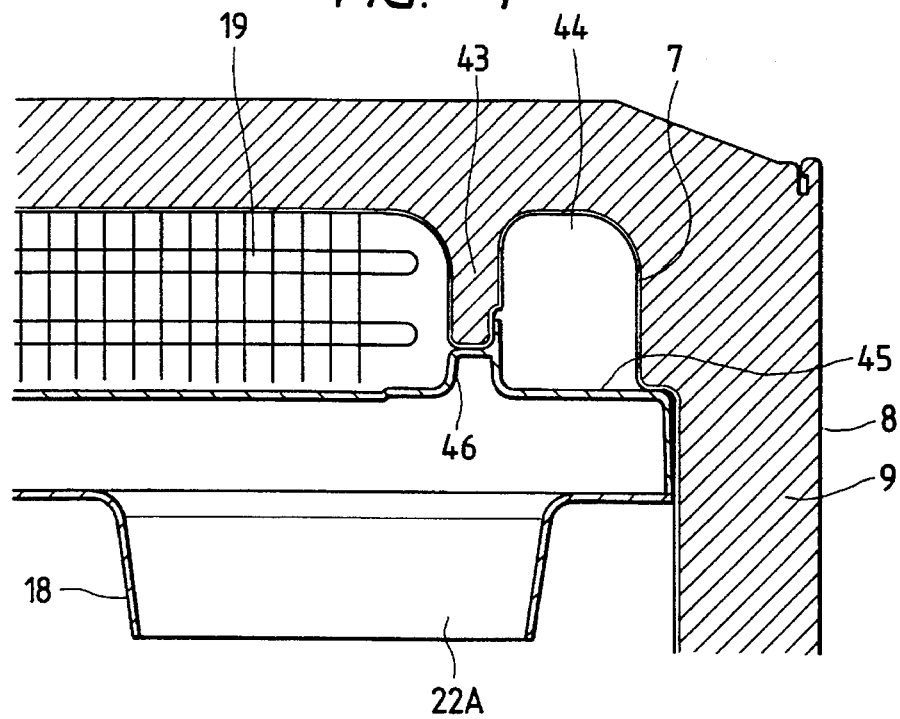
FIG. 4 is an enlarged section view showing the main portion (portion A) of FIG. 3.
Figure 5:
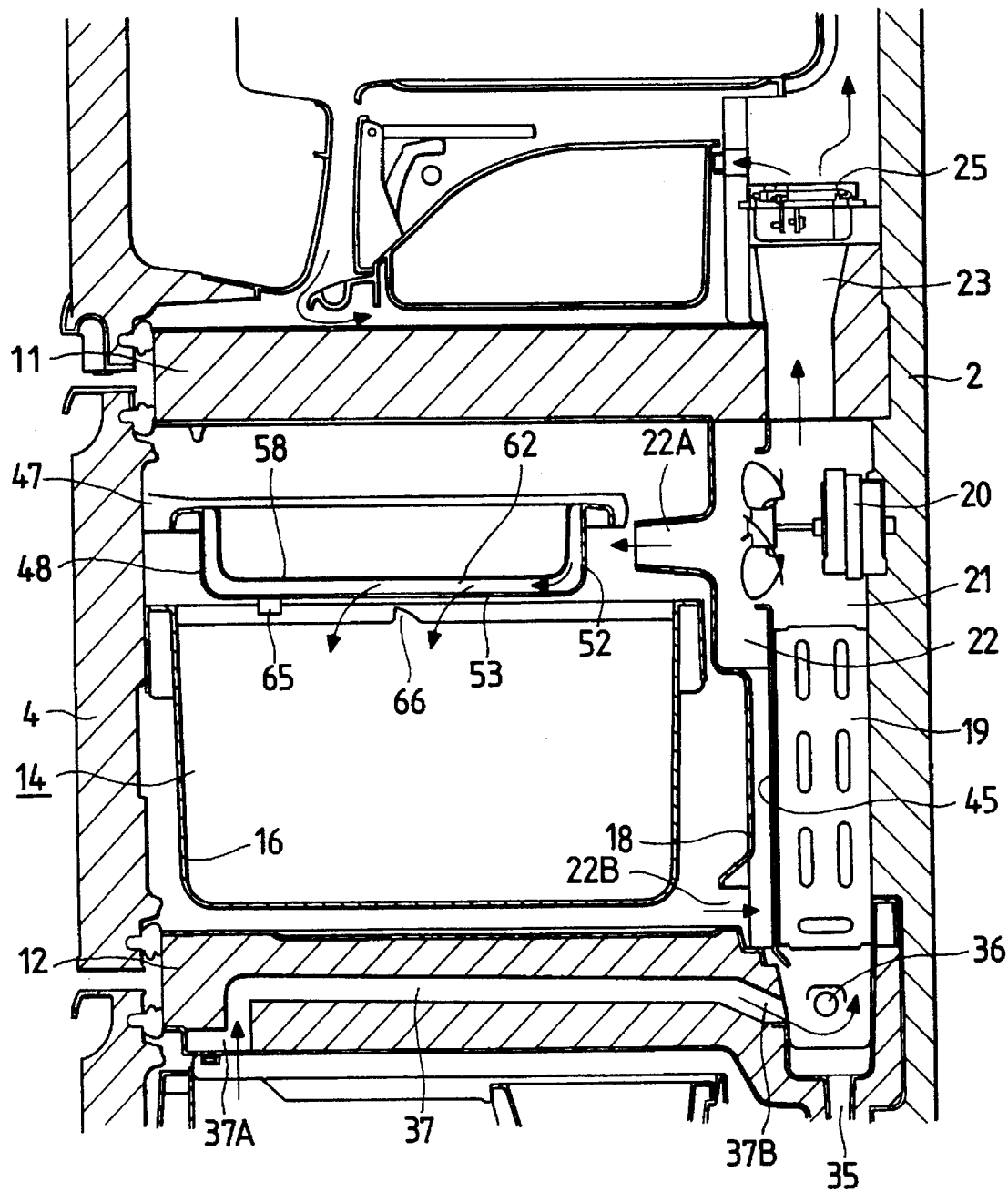
FIG. 5 is a section view along the line V—V of FIG. 3.
Figure 6:
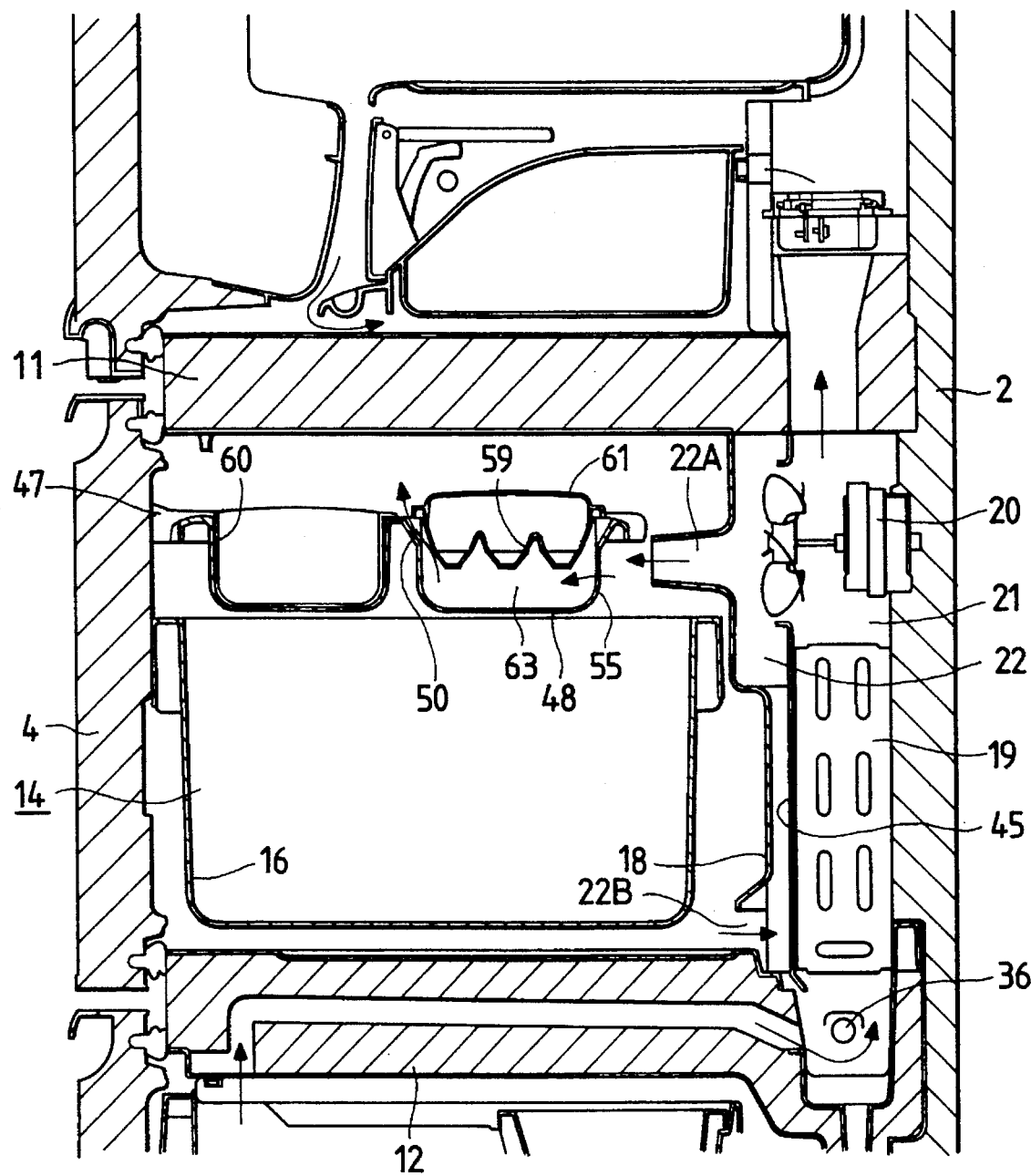
FIG. 6 is a section view along the line VI—VI of FIG. 3.
Figure 7:
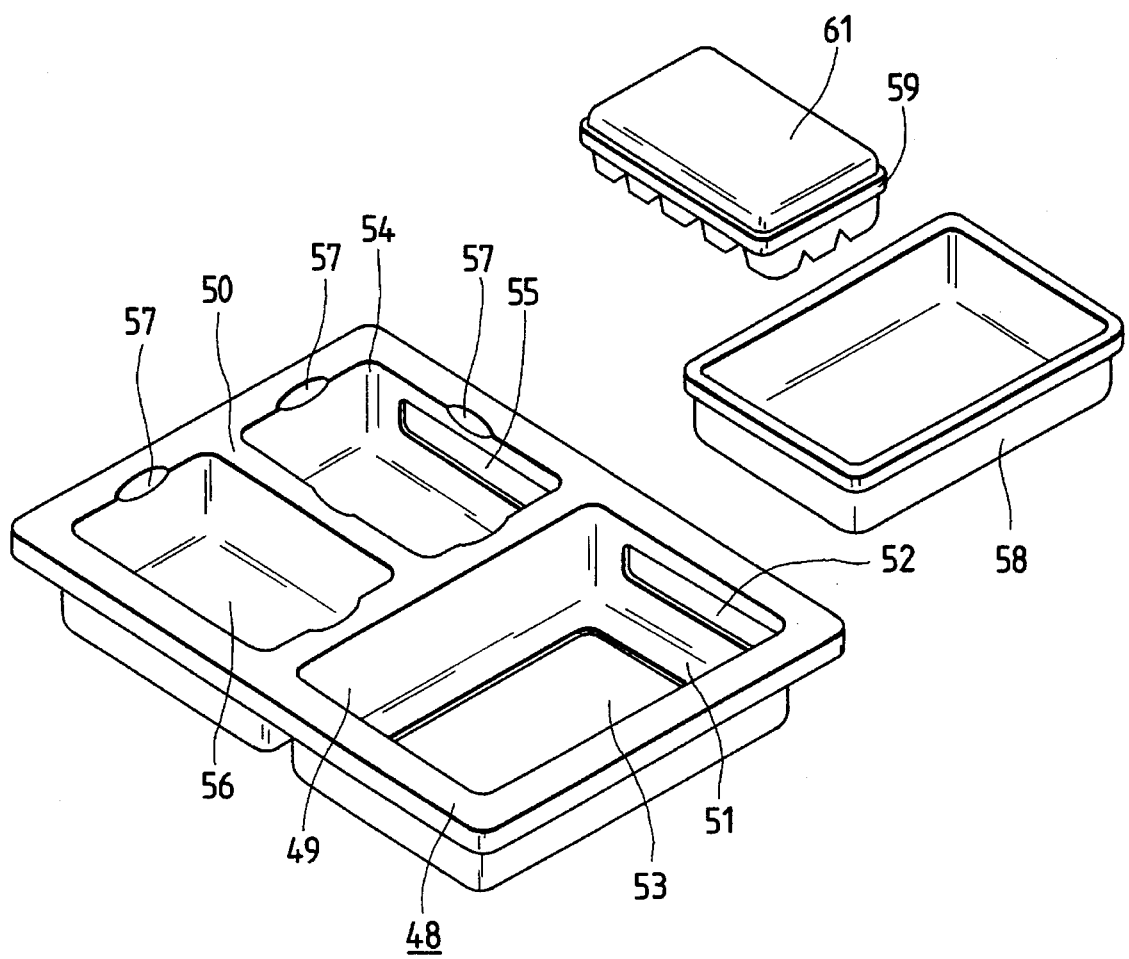
FIG. 7 is a perspective view of the upper container, a small-food container, and an ice tray of the freezer compartment.

Hereinafter, embodiments of the first aspect of the invention will be described with reference to FIGS. 1 to 7. FIG. 1 is a longitudinal sectional side view of a refrigerator, FIG. 2 is an enlarged longitudinal sectional front view showing the main portion and illustrating the cold air circulation into a refrigerating compartment and a vegetable compartment according to the invention, FIG. 3 is a cross section view showing a section obtained when an upper container of a freezer compartment is horizontally cut at its upper portion, FIG. 4 is an enlarged section view showing the main portion (portion A) of FIG. 3, FIG. 5 is a section view along the line V—V of FIG. 3, FIG. 6 is a section view along the line VI—VI of FIG. 3, and FIG. 7 is a perspective view of an upper container, a small-food container, and an ice tray of the freezer compartment.

In FIG. 1, reference numeral 1 designates a household refrigerator. The refrigerator 1 comprises a heat insulated housing 2 which constitutes the body of the refrigerator and opens at the front, and doors 3, 4 and 5 for closing the opening of the housing. The heat insulated housing 2 consists of an inner shell 7 made of a synthetic resin, an outer shell 8 made of metal such as a coated steel plate, and a foamed heat insulating material 9 such as foamed polyurethane resin which is filled between the inner and outer shells. The door 3 is a hinged door of a refrigerating compartment 13 which will be described later, and the doors 4 and 5 are drawer type doors. The door 4 is provided for a freezer compartment 14, and the door 5 for a vegetable compartment 15.

The reference numerals 11 and 12 designate horizontal partitions for dividing the inner space of the heat insulated housing 2 into three sections, i.e., upper, middle, and lower sections. In the embodiment, the section over the partition 11 serves as the refrigerating compartment 13 that is cooled to a temperature (e.g., about 3° C.) at which foods do not freeze, the section over the partition 12 serves as the freezer compartment 14 that is cooled to a freezing temperature (e.g., about −20° C.), and the section under the partition 12 serves as the vegetable compartment 15 that is cooled to a temperature (e.g., about 7° C.) which is slightly higher than that of the refrigerating compartment and suitable for storing vegetables. The door 4 is provided with a container 16 for storing frozen food and functioning as the lower container, and the door 5 is provided with a container 17 for storing vegetables.

A partition plate 18 is disposed at the back of the freezer compartment 14. Behind the partition plate 18, formed is a cooler chamber 21 wherein a plate-fin evaporator 19 functioning as a cooler and an air blower 20 such as a propeller fan are disposed.

The reference numeral 22 designates a freezing cold-air duct through which cold air cooled by the evaporator 19 is guided to the freezer compartment 14 via cold air outlet openings 22A and the cold air is returned from cold air inlet openings 22B to the lower portion of the cooler chamber 21 (more specifically, the location below the evaporator 19), 23 designates a refrigeration cold-air duct which passes through the horizontal partition 11 and through which cold air cooled by the evaporator 19 is supplied to the refrigerating compartment 13, and 24 designates a distribution cold-air duct which communicates with the refrigeration cold-air duct 23 and distributes cold air into the refrigerating compartment 13 through outlet openings 24A and 24B. The reference numeral 25 designates a damper device that is a so-called shape memorizing damper and located at the connecting portion at which the distribution cold air duct 24 is connected with the refrigeration cold air duct 23.

A machine chamber 33 wherein a compressor 31 and an evaporating tray 32 are disposed is formed below and behind the heat insulated housing 2. The reference numeral 35 designates a drip pan which is disposed below the evaporator 19, and 36 designates a defrosting heater such as a silica glass tube heater or a Vycor glass tube heater which is disposed between the drip pan 35 and the evaporator 19. A layer of platinum ceramic deodorization catalyst is coated on the surface of the glass tube of the defrosting heater 36 and then baked. When the compressor 31 is operated (i.e., during the cooling process), the defrosting heater 36 adsorbs odor components contained in the cold air which is returned to the location below the evaporator 19, and the resulting clean cold air is then subjected to heat exchange in the evaporator. When the defrosting heater 36 is operated (i.e., during the defrosting process), the odor components adsorbed during the cooling process are subjected to oxidative decomposition by the platinum catalyst so that the catalyst layer of the defrosting heater 36 is activated and clean air is generated. In other words, the defrosting heater 36 has a function of deodorizing and cleaning cold air by which odor components are adsorbed and subjected to oxidative decomposition, thereby producing clean cold air.

The reference numeral 37 designates a vegetable compartment cold-air return passage which elongates along the front-to-rear direction inside the horizontal partition 12. The cold-air return passage elongates from a cold air suction port 37A formed on the front portion of the lower face of the horizontal partition 12, to a return port 37B formed in the rear portion of the partition wall 12 and below the evaporator (more specifically, the portion in the side of the defrosting heater 36). The cold-air return passage 37 has an upward slope portion which starts from the cold air suction port 37A, and a downward slope portion which is gently inclined in the direction from the highest point to the return port 37B. The reference numeral 38 designates a water pipe for guiding defrosted water from the drip pan 35 to the evaporating tray 32. Since the return port 37B of the vegetable compartment cold-air return passage 37 is located in the side of the defrosting heater 36, cold air which has passed through the refrigerating compartment 13 and the vegetable compartment 15 and contains odor components can efficiently be contacted with the defrosting heater 36, thereby improving the adsorptivity for odor components. The vegetable compartment cold-air return passage 37 is directed to the return port 37B while being gently inclined. Even when dewdrops are produced in the passage 37, therefore, the dewdrops can be guided to the return port 37B and then to the drip pan 35, whereby the dewdrops are prevented from entering the vegetable compartment 15.

The cold air which is guided into the refrigerating compartment 13 from the outlet openings 24A and 24B of the distribution cold air duct 24 cools the refrigerating compartment 13, and is then guided through a refrigerating compartment return port 41 which is formed in the right and lower portion of the refrigerating compartment as viewed from the front of the refrigerator, and a guide duct 42 to a cold air passage 44 which is formed in the right portion of the cooler chamber 21. The cold air passage 44 will be described later.

The reference numeral 43 designates a projection which is formed on a back wall portion of the inner shell 7 corresponding to the freezer compartment 14 and which elongates in the vertical direction. The projection 43 contacts with the back of a cooler cover 45 (more specifically, a positioning projection 46 formed on the back of the cooler cover) which is located behind the partition plate 18 and which serves as a second partition plate, so that the space behind the cooler cover 45 is divided into two chambers arranged in a lateral direction. Namely, the cooler chamber 21 is formed at the left side of the projection 43, and the cold air passage 44 (described later) is formed at the right side of the projection.

The space defined by the projection 43, the cooler cover 45, and the inner shell 7 functions used as the cold air passage 44 which is connected at one end to the guide duct 42 of the refrigerating compartment 13 and at the other end to the vegetable compartment 15. According to this configuration, the duct (i.e., the cold air passage 44) for guiding cold air from the refrigerating compartment to the vegetable compartment can be formed in a simplified manner by attaching a part (i.e., the cooler cover 45) for forming the cooler chamber 21 to a predetermined location, and without using special duct members. This can reduce the number of parts. Since the cold air passage 44 is not embedded in the heat insulating material 9, the work of assembling the passage is improved as compared with that in the prior art, and the drawback that the heat insulating property of the back wall of the heat insulated housing 2 is partially degraded (i.e., owing to the portion at which the duct is embedded) is eliminated. Moreover, the formation of the cold air passage 44 does not reduce the effective capacity of the freezer compartment.

The reference numeral 47 designates rails which are respectively formed in the front-to-rear direction on the right and left side walls of the inner shell 7 corresponding to the freezer compartment 14 in such a manner that they oppose each other. The rails 47 support an upper container 48 which will be described later, so that the upper container is movable in the front-to-rear direction. The upper container 48 is divided into right and left divisions by a division wall 49, and the left division is subdivided into front and rear divisions by a division wall 50. In the division 51, an inlet opening 52 is formed at the rear portion and an outlet opening 53 at the bottom. Another inlet opening 55 is formed at the rear portion of the division 54. Finger insertion openings 57 are formed in the divisions 54 and 56. The cold air outlet openings 22A of the partition plate 18 are formed so as to respectively correspond to the inlet openings 52 and 55 of the upper container 48.

The reference numeral 58 designates a small-food container which is made of metal (e.g., aluminum) and detachably placed on the division 51 of the upper container 48, 59 designates an ice tray which is made of synthetic resin, opens at an upper face and detachably placed on the division 54, and 60 designates an ice container which is made of synthetic resin and placed in the division 56. The upper opening of the ice tray 59 is closed by a lid 61 made of synthetic resin.

In a state where the small-food container 58 is placed on the division 51 of the upper container 48, a cold air passage 62 elongating from the inlet opening 52 to the outlet opening 53 is formed by the lower face of the small-food container 58 and the division 51 of the upper container 48. In other words, the cold air passage 62 is formed by using the space enclosed by the lower face of the small-food container 58 and the division 51 of the upper container 48. Accordingly, special ducts for forming the cold air passage 62 are not required, and the reduction of the effective storage capacity of the freezer compartment can be suppressed to the minimum.

In a state where the ice tray 59 is placed on the division 54 of the upper container 48, a cold air passage 63 elongating from the inlet opening 55 to the finger insertion opening 57 is formed by the ice tray 59 and the division 54 of the upper container 48. In other words, the cold air passage 63 is formed by using the space enclosed by the ice tray 59 and the division 54 of the upper container 48. Accordingly, special ducts for forming the cold air passage 63 are not required. Since the ice tray 59 is covered by the lid 61 and only the lower face of the ice tray 59 is cooled by cold air, moreover, the transparency of ice can be enhanced and cold air can be supplied through the finger insertion opening 57 of the upper container 48 to the space over the upper container 48 and also to the lower container 16. Accordingly, a guide duct for the upper face of the upper container 48 and a duct dedicated to guiding cold air to the lower container are not required, whereby the number of parts can be reduced.

The reference numeral 65 designates a projection which is formed on the front portion of the lower face of the division 51 of the upper container 48 so as to face the inside of the lower container 16. The reference numeral 66 designates an engaging portion which is formed at a position of the upper portion of the lower container 16 which position is rearward separated from the projection 65 by a predetermined distance under a state where the upper container 48 and the lower container 16 are respectively placed at prescribed positions. Therefore, only the lower container 16 can be drawn out until the door 4 of the freezer compartment is drawn out by the predetermined distance. When the door 4 is drawn out by a distance longer than the predetermined distance, the engaging portion 66 of the lower container 16 engages with the back of the projection 65 of the upper portion 48 so that both the upper and lower containers are drawn out together with the door 4. When the door 4 of the freezer compartment is drawn out by a distance longer than the predetermined distance, therefore, also the upper container 48 is drawn out together with the door. This allows the quantity of ice in the ice container 60 and the icing state of the ice tray 59 to be confirmed every time the door is drawn out. Since the ice tray 59 is covered by the lid 61, water in the tray is not caused to fall by the operations of drawing out and in the door 4.

According to the above-mentioned embodiments, the cold air passage for guiding cold air of the refrigerating compartment to the vegetable compartment can be formed by using the projection of the back wall of the inner shell corresponding to the freezer compartment, the partition plate for forming the cooler chamber, and the inner shell. Accordingly, it is not required to use special parts for forming the cold air passage, and to conduct the work of mounting ducts on the back wall of the heat insulated housing. Further, it is possible to suppress the degradation of the heat insulating property of the heat insulated housing.

Furthermore, the cold air passage elongating from the inlet opening of the upper container to the outlet opening can be formed by using a space formed between the upper container and the small-food container which is made of metal and detachably placed on the upper container. This eliminates the necessity of providing special ducts for forming the cold air passage, and enables the lower container to be supplied with cold air from the outlet opening of the upper container. Accordingly, a duct dedicated to guiding cold air to the lower container is not required, whereby the number of parts can be reduced.

Moreover, the cold air passage elongating from the inlet opening of the upper container to the finger insertion opening can be formed by using a space formed between the upper container and the ice tray which opens at an upper face and detachably placed on the upper container. This eliminates the necessity of providing special ducts for forming the cold air passage. Since the ice tray is covered by the lid and cold air cools the lower face of the ice tray, the transparency of produced ice can be enhanced. Further, cold air can be supplied through the finger insertion opening, to the upper face of the upper container and also to the lower container. Accordingly, a guide duct for the upper face of the upper container and a duct dedicated to guiding cold air to the lower container are not required, whereby the number of parts can be reduced.

Still further, a projection is formed on a lower face of the upper container, and an engaging portion is formed in an upper portion of the lower container so that the engaging portion is engaged with the projection when the door of the freezer compartment is drawn out by a predetermined distance. Only the lower container can be drawn out until the door of the freezer compartment is drawn out by the predetermined distance. When the door is further drawn out, the engaging portion of the lower container engages with the projection of the upper portion so that both the upper and lower containers are drawn out together.

Figure 8:
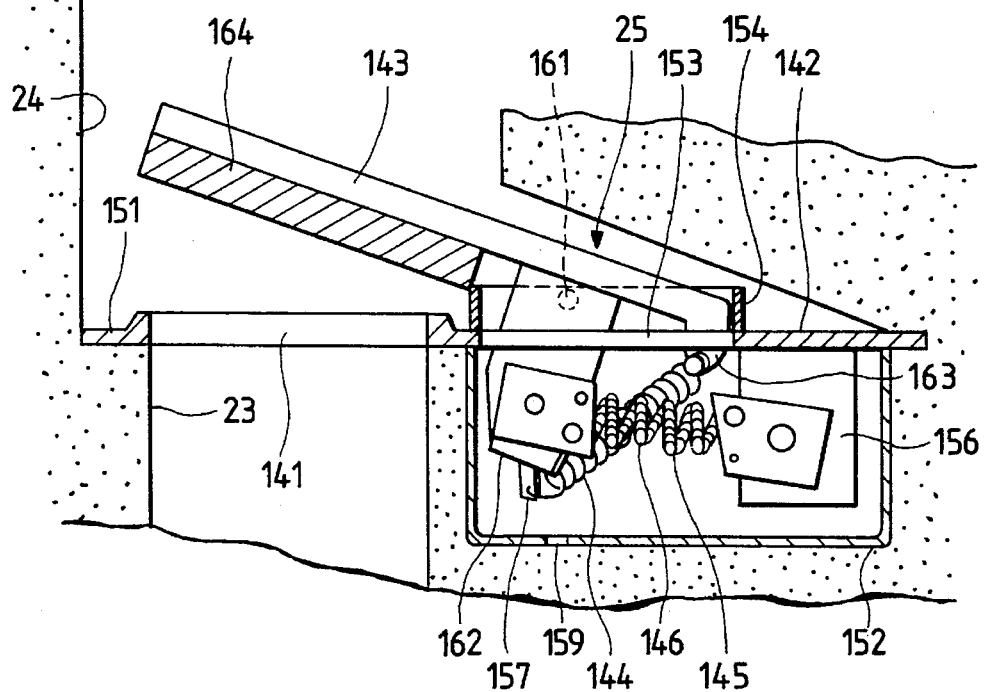
FIG. 8 is an enlarged section view of the vicinity of a damper device according to the invention which is disposed in the inlet of a cold air duct for a refrigerating compartment.
Figure 10:
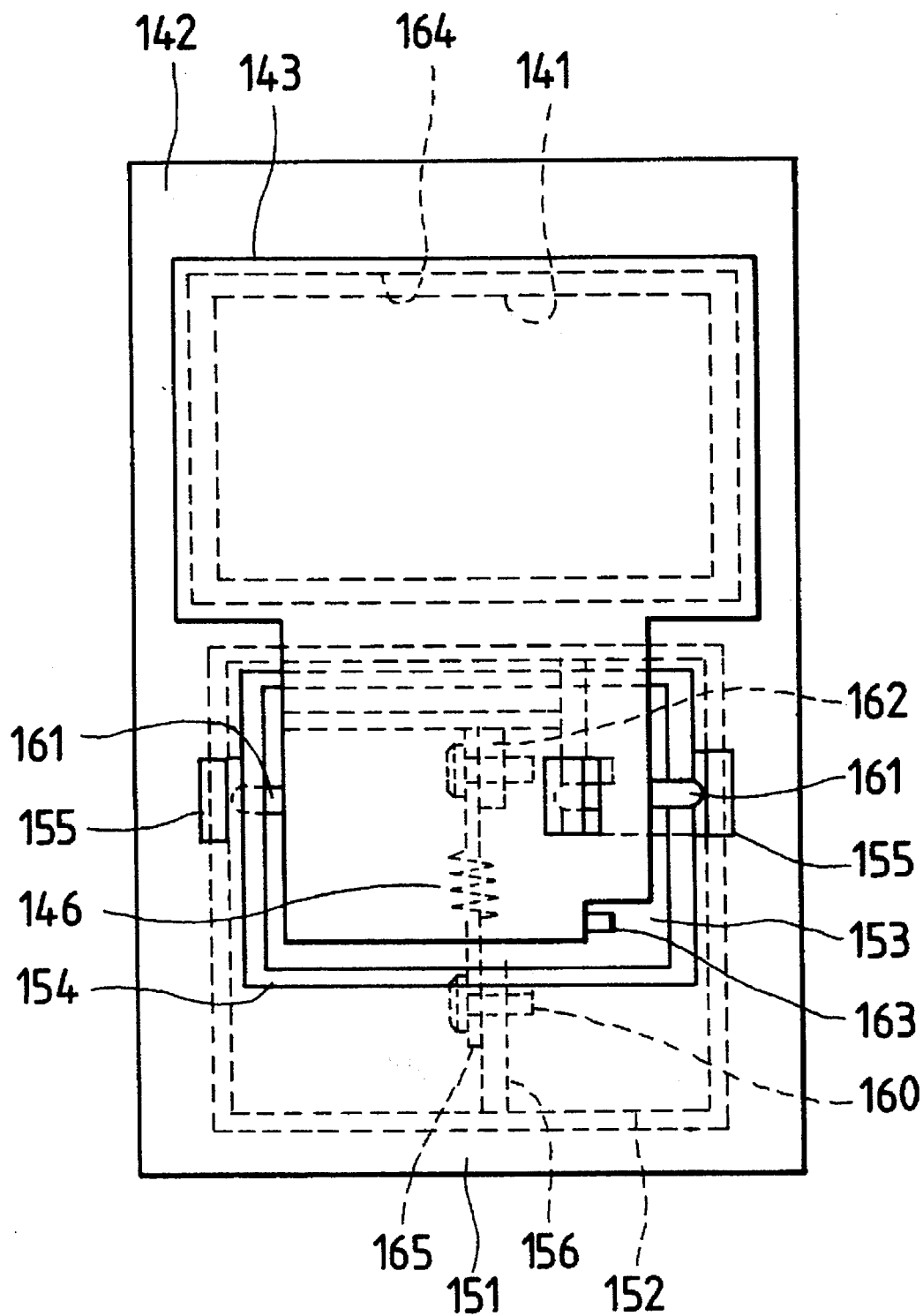
FIG. 10 is a plan view of the damper device.
Figure 11:
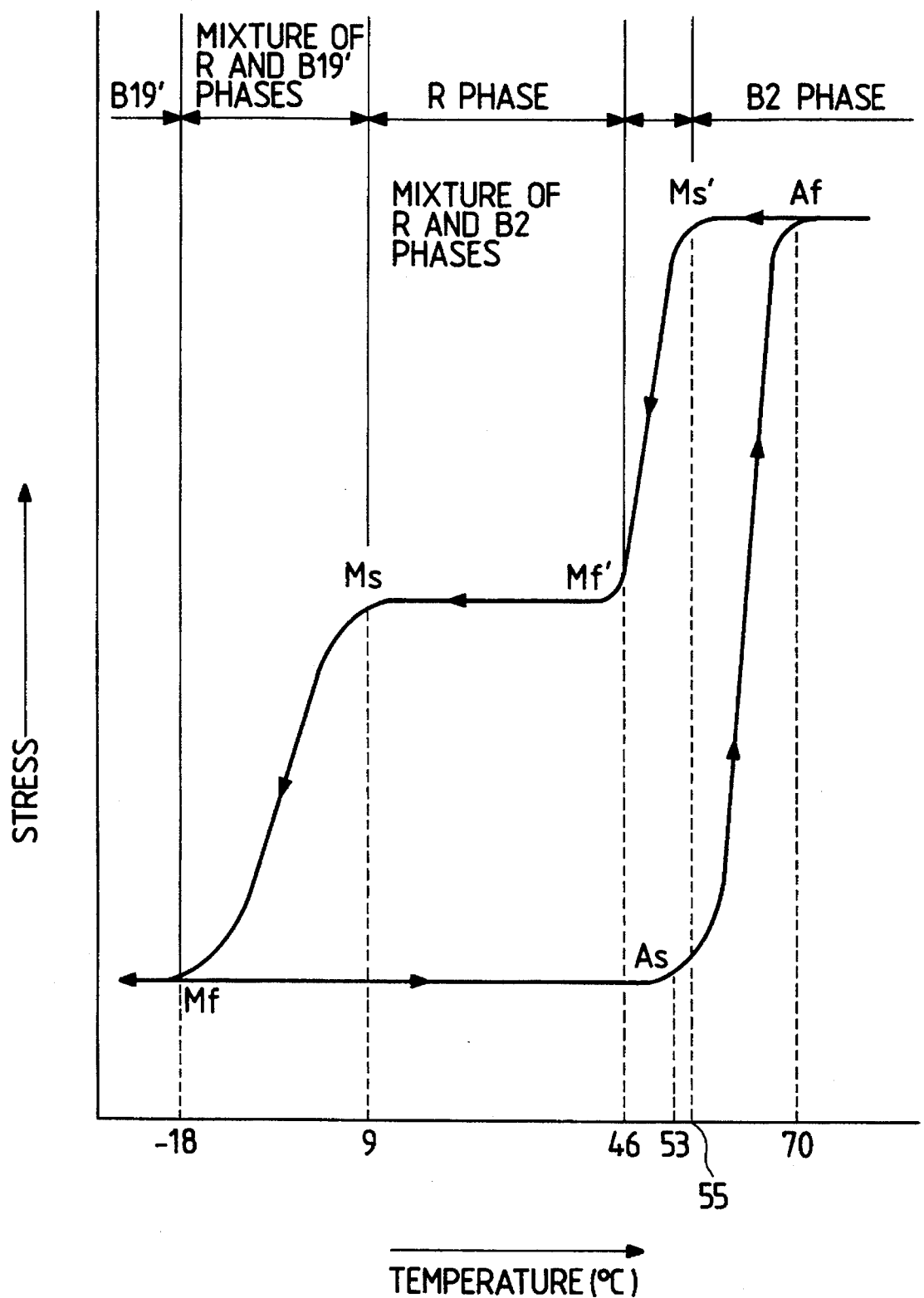
FIG. 11 is a graph showing the stress-temperature characteristics of a shape memorizing alloy coil spring.
Figure 12:
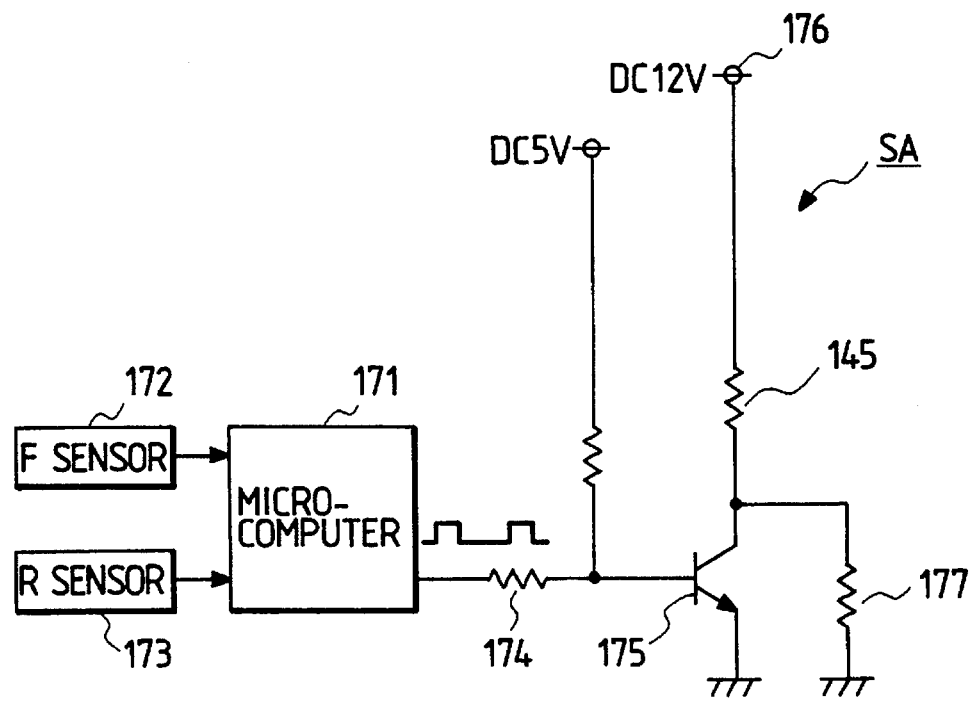
FIG. 12 is a circuit diagram showing a first embodiment of a damper control device.
Figure 13:
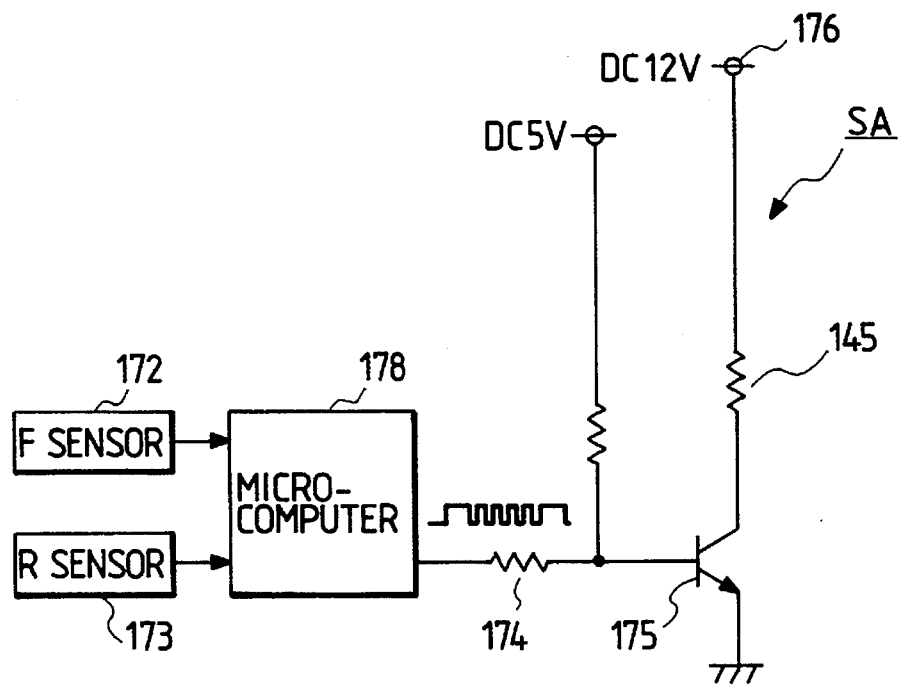
FIG. 13 is a circuit diagram showing a second embodiment of the damper control device.
Figure 14:
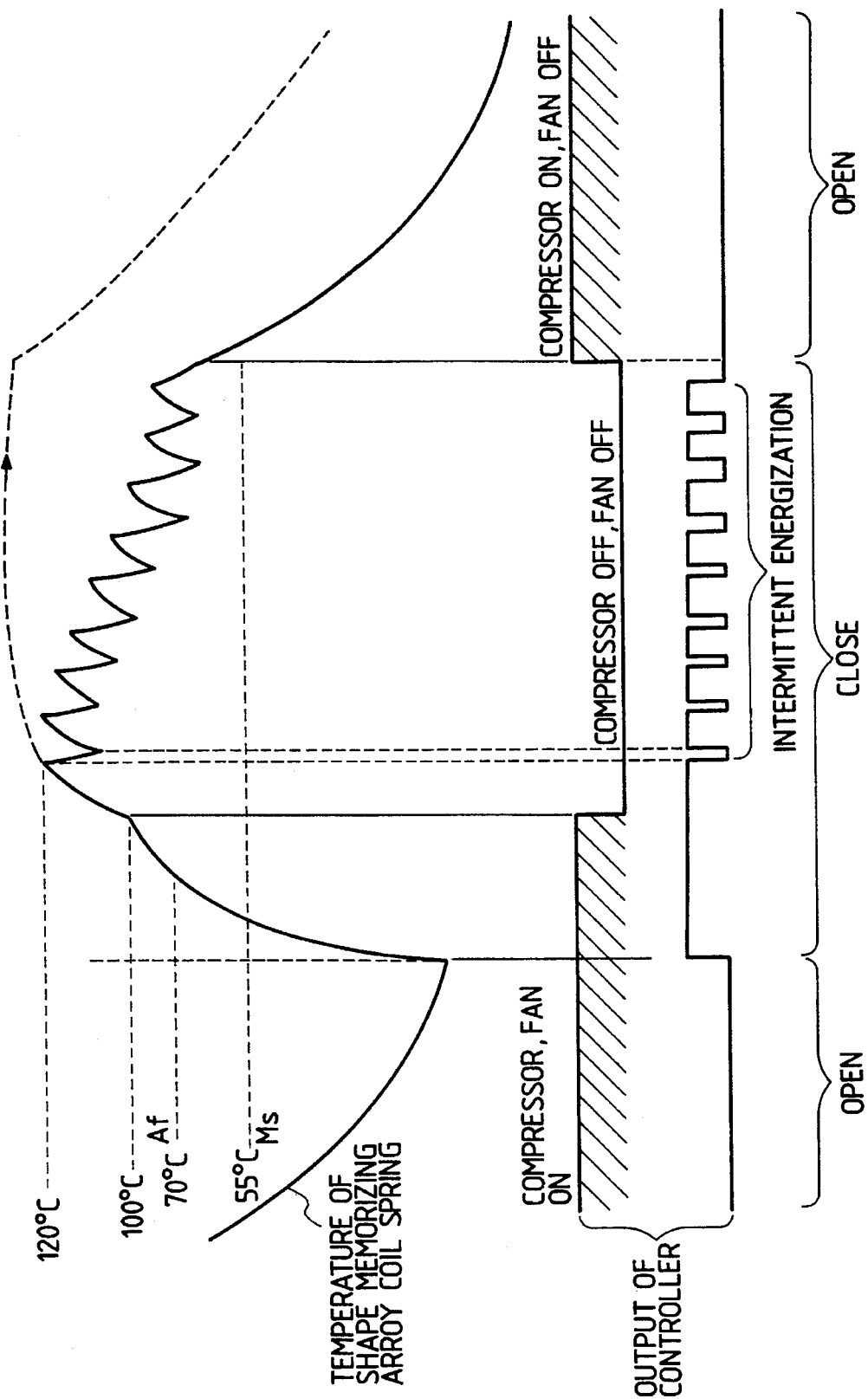
FIG. 14 is a time chart showing operating states of a compressor, an air blower and a heater and the temperature variation of the shape memorizing alloy coil spring.

Hereinafter, embodiments of the second aspect of the invention will be described with reference to FIGS. 8 to 14. FIG. 8 is an enlarged section view of the vicinity of a damper device according to the invention which is disposed in the inlet of a cold air duct for a refrigerating compartment, FIG. 9 is an exploded perspective view of the damper device, FIG. 10 is a plan view of the damper device, FIG. 11 is a graph showing the stress-temperature characteristics of a shape memorizing alloy coil spring, FIGS. 12 and 13 are circuit diagrams respectively showing embodiments of a damper control device, and FIG. 14 is a time chart showing operating states of a compressor, an air blower and a heater and the temperature variation of the shape memorizing alloy coil spring.

The damper device 25 comprises a case 142 made of a transparent resin and having an opening 141 which communicates with the distribution cold air duct 24, a shutter plate 143 which is rotatably and pivotally supported by the case 142 and can close and open the opening 141, a bias spring 144 which urges the shutter plate 143 toward the opening direction, and a shape memorizing alloy coil spring 146 on which a heater 145 such as a kanthal heater is wound. When heated to the austenite phase transition terminate temperature (Af point) or higher, the shape memorizing alloy coil spring 146 is restored to the original shape which has been memorized, to cause the shutter plate 143 to close the opening against the urging force of the bias spring 144.

The case 142 consists of a base plate 151, and a cover 152. The base plate 151 comprises the opening 141, a through hole 153 to which a part of the shutter plate 143 faces, a rib 154 which is formed in the periphery of the through hole in order to pivotally support the shutter plate 143, two insertion holes 155 into which two claws 158 formed on the cover 152 are to be inserted a fixing portion 156 to which one end of the shape memorizing alloy coil spring 146 is fixed, and a fixing portion 157 to which one end of the bias spring 144 is fixed. The cover 152 has a vessel-like shape which opens at one face. The two claws 158 are formed at portions of the periphery of the opening. A hole 159 for air intake is formed on another face of the cover 152.

The shutter plate 143 comprises two shafts 161 which are pivotally supported by the rib 154 of the base plate 151, a fixing portion 162 to which the other end of the shape memorizing alloy coil spring 146 is fixed, a fixing portion 163 to which the other end of the bias spring 144 is fixed, and a seal member 164 such as foamed polystyrene for, when the opening 141 is closed, sealing the opening 141 and the shutter plate 143.

Figure 18:
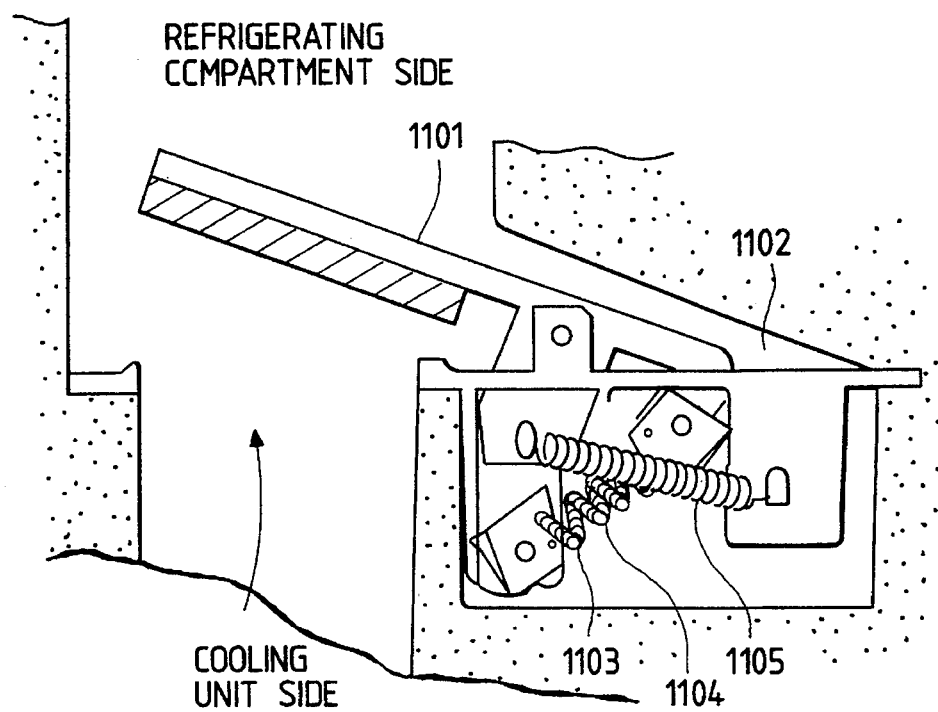
FIG. 18 is a view showing a prior art damper device.
Figure 19:
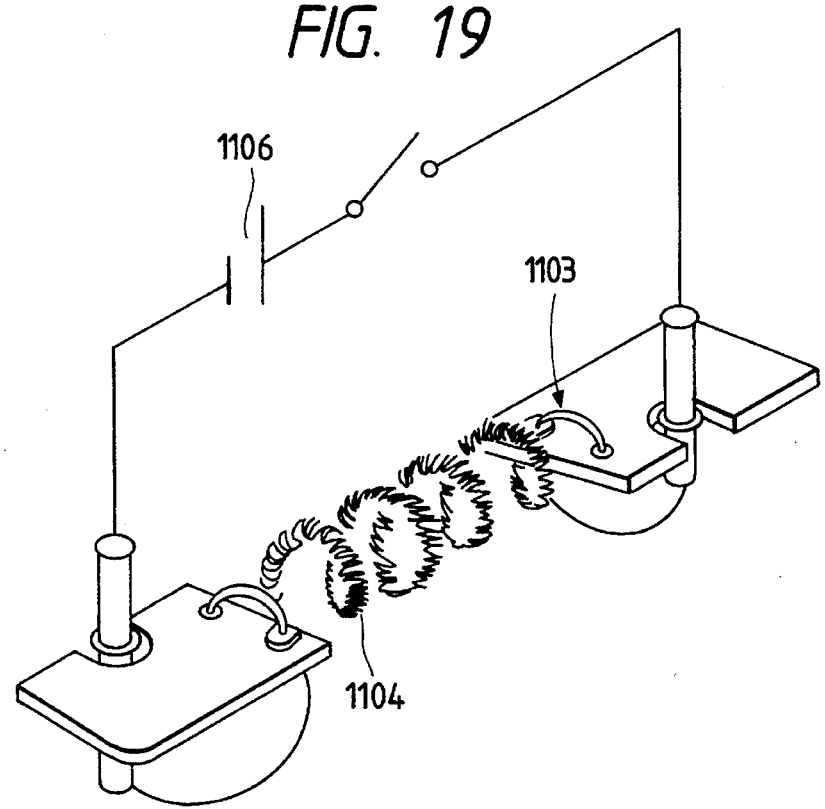
FIG. 19 is a circuit diagram showing a prior art damper control device.

The both ends of the shape memorizing alloy coil spring 146 are fixed through fixing members 165 to the fixing portions 156 and 162 by tools 160 such as screws, respectively. The both ends of the heater 145 are connected to the fixing members 165, respectively. Fixing terminals 167 which are used for connecting lead wires 166 are attached to the fixing members 165. The heater 145 is electrically connected to the fixing terminals 167 by means of pressure welding. In FIG. 9, the both ends of the shape memorizing alloy coil spring 146 and the bias spring 144 are fixed to the shutter plate 143 and the case 142, respectively. When compared with FIG. 18 showing the prior art, the directions in which the urging forces of the springs are applied in the invention are opposite to those in the prior art.

Next, the stress-temperature characteristics of the shape memorizing alloy coil spring 146 in the invention will be briefly described. In a cooling process wherein the hysteresis is great as shown in FIG. 11, generally, used is a shape memorizing alloy having characteristics in which transformation is conducted in two stages, the intermediate phase (so-called randhedral phase (hereinafter, referred to as merely "R phase"), and the martensite phase (hereinafter, referred to as merely "M phase") (particularly, an combination of an alloy having the R phase and a bias load (bias spring) is used). In this case, the phase transformation due to cooling and heating proceeds in the sequence of B2 → R → M → B2. In the invention, as a specific example of such an alloy, used is a shape memorizing alloy (a TiNi alloy) having a temperature zone in which the Af point is 70° C., the austenite phase transition start temperature As (hereinafter, referred to as merely "As point") is 53° C., the martensite phase transition start temperature Ms' in the R phase (referred to as merely "Ms' point") is 55° C., the martensite phase transition terminate temperature Mf' in the R phase (referred to as merely "Mf' point") is 46° C., the martensite phase transition start temperature Ms in the M phase (referred to as merely "Ms point") is 9° C., and the martensite phase transition terminate temperature Mf in the M phase (referred to as merely "Mf point") is in the vicinity of −18° C. A particularly useful alloy is a TiNi alloy of 45.2 wt. % of Ti and 54.8 wt. % of Ni.

In FIG. 12 showing a first embodiment of a damper control device SA, 171 designates a microcomputer which functions as control means. The control means 171 controls the levels of currents supplied to the compressor 31, the air blower 20 and the heater 145 on the basis of temperature detection signals from a freezer compartment temperature sensor (hereinafter, referred to as "F sensor") 172 for detecting the temperature of the freezer compartment 14, and a refrigerating compartment temperature sensor (hereinafter, referred to as "R sensor") 173 for detecting the temperature of the refrigerating compartment. An output port of the control means 171 is connected through a resistor 174 to the base of a transistor 175. The emitter of the transistor is grounded, and the collector is connected to a DC power source (e.g., 12 V) 176 through the heater 145, and grounded through a bias resistor 177.

When the temperature of the refrigerating compartment detected by the R sensor 173 is not higher than a preset lower limit temperature for the refrigerating compartment, the control means 171 outputs a high level signal (hereinafter, referred to as "H signal") from the output port to turn on the transistor 175, so that a voltage of about 12 V is applied to the heater 145.

Experiments using an actual refrigerator were conducted while realizing the heater 145 by a heating wire having a diameter ϕ of 0.11 mm, a length of about 1.6 m, and a resistance of about 190 Ω. In the experiments, the quantity of generated heat amounted to 0.75 W/h, the temperature of the shape memorizing alloy coil spring 146 was stabilized at about 90° C. which is higher than the Af point (70° C.), and the operation of closing the opening 141 by the shutter plate 143 was conducted with a margin as compared with that in a prior art refrigerator (i.e., the case where a shutter plate is lifted up with supplying an excessive electric power so as to overcome the quantity of cooling owing to cold air). This is due also to a configuration wherein the lower limit temperature obtained when the coil spring is cooled is higher than that obtained in a prior art configuration. The lower limit temperature will be described later.

In contrast, when the temperature of the refrigerating compartment detected by the R sensor 173 is not lower than a preset higher limit temperature for the refrigerating compartment, the control means 171 outputs a low level signal (hereinafter, referred to as "L signal") from the output port to turn off the transistor 175, so that a voltage of about 12 V is applied to the series circuit of the heater 145 and the bias resistor 177. This causes the temperature of the shape memorizing alloy coil spring 146 to be lowered to the vicinity of the Ms point (9° C.), and the shutter plate 143 is made to enter the fully open state.

Experiments using an actual refrigerator were conducted while setting the resistance of the bias resistor 177 to be 160 Ω. In the experiments, the quantity of heat generated by the heater 145 amounted to about 0.2 W/h (which is about 27% of that obtained in the case of the H signal). Under a condition in which the lowest temperature was obtained, the temperature of the shape memorizing alloy coil spring 146 was maintained at about 10° C., and it was possible to set the shutter plate 143 to the fully open state. This cooling process was conducted so that the shape memorizing alloy coil spring 146 was not cooled to a temperature lower than the vicinity of the Ms point. Therefore, the power consumption was increased but the shutter plate was shut down in a short time as compared with a prior art refrigerator in which a shutter plate is shut down by completely deenergizing a heater. Since the temperature is restricted to being lowered to about 10° C., the shape memorizing alloy coil spring 146 can be used using only the R phase transformation (i.e., R → B2, B2 → R transformation), whereby the heat cycle fatigue characteristics and repeating characteristics of the damper device 25 can be improved as compared those in the prior art. Experiments were carried out in which, using two damper devices, one was provided with the bias resistor 177 and the other was provided with no bias resistor, the variation of the contraction force of the coil spring 146 was measured while increasing the number of opening and closing operations. The experimental results show that the reduction of the contraction force in the damper device provided with the bias resistor 177 was smaller than that in the damper device provided with no bias resistor.

A second embodiment of the damper control device SA is shown in FIG. 13. This embodiment is different from that of FIG. 12 in that a bias resistor is not provided, and that control means 178 outputs signals which are different from those output from the control means 171. The other portions are designated with the same reference numerals as those of FIG. 12.

When the temperature of the refrigerating compartment detected by the R sensor 173 is not higher than a preset lower limit temperature for the refrigerating compartment, the control means 178 conducts the control for closing the damper device 25, or outputs an H signal from an output port to turn on the transistor 175, so that a voltage of about 12 V is applied to the heater 145.

In contrast, when the temperature of the refrigerating compartment detected by the R sensor 173 is not lower than a preset higher limit temperature for the refrigerating compartment, the control means 178 conducts the control for opening the damper device 25, or outputs alternatingly (intermittently) from the output port an H signal and an L signal to intermittently turn on the transistor 175, so that a DC voltage (about 12 V) is intermittently applied to the heater 145.

For example, the H signal was output for 4 seconds from the output port of the control means 178 and the L signal for 11 seconds so that the quantity of heat generated by the heater 145 amounted to about 0.2 W. In this case, under a condition in which the lowest temperature was obtained, the temperature of the shape memorizing alloy coil spring 146 was maintained at the vicinity of the Ms point (about 10° C.), and the shutter plate 143 was lifted up without any trouble. The time required for the opening operation was shorter than that required in the prior art wherein the closing operation is conducted by cooling a coil spring.

In other words, the control means 178 controls the temperature of the shape memorizing alloy coil spring 146 in such a manner that the shape memorizing alloy coil spring 146 is heated to a temperature of the Af point or higher by continuously supplying a current to the heater 145, and that the temperature of the shape memorizing alloy coil spring 146 is stabilized in the vicinity of the Ms point by intermittently supplying a current to the heater 145.

In the configuration described above, when the shutter plate 143 is to be shut down, a current is supplied to the heater 145, and, when the shutter plate 143 is to be lifted up, the duty factor of the heater 145 is reduced, whereby the opening and closing characteristics of the damper device which is always exposed to cold air can be improved as compared that in the prior art.

Furthermore, the heater 145 is always supplied with a weak current even in the state where the shutter plate 143 is lifted up (or the shape memorizing alloy coil spring 146 is cooled). Therefore, the shape memorizing alloy coil spring 146 is maintained at a temperature of the R phase transformation or the middle of transformation of the R phase to the M phase. This causes the contraction force and degree of distortion of the shape memorizing alloy coil spring 146 to be less reduced with respect to the initial values even after the opening and closing operations of 300,000 times or more, resulting in that the durability of the damper device 25 is remarkably enhanced. Moreover, since the current supply to the heater 145 is conducted so that the heater generates heat of the minimum requirement, the responsibility of the opening and closing operation is improved.

The configuration wherein the duty factor of the heater 145 is reduced after the opening 141 is closed by the shutter plate 143 (i.e., after the shape memorizing alloy coil spring 146 is heated to the Af point or higher) allows the shape memorizing alloy coil spring 146 to be maintained at a temperature which is higher than the Ms point of the R phase transformation and lower than the Af point. Accordingly, as compared with the prior art, the power consumption of the heater 145 can be reduced, and the temperature drop characteristics of the shape memorizing alloy coil spring 146 at the cooling process can be improved.

Finally, a third embodiment of the damper control device will be described with reference to FIG. 14. The damper control device of third embodiment controls signals in the following manner: When the shutter plate 143 is to be lifted up, the current supply to the heater 145 is stopped. When the shutter plate 143 is to be shut down, the current supply to the heater 145 is continuously conducted in the initial stage, and, after the temperature of the shape memorizing alloy coil spring 146 exceeds the Af point, the current supply to the heater 145 is intermittently conducted. FIG. 14 shows a state of the temperature variation of the shape memorizing alloy coil spring obtained in the case where the intermittent current supply was started after the elapse of a predetermined time period (e.g., 2 minutes) from the instance when the temperature of the freezer compartment 14 was dropped to the preset lower limit temperature for the freezer compartment or lower. The intermittent current supply is terminated when the temperature of the freezer compartment is raised to the preset higher limit temperature or higher.

According to this control, the power consumption required for shutting down the shutter plate 143 (i.e., for heating the shape memorizing alloy coil spring) can be made smaller than that in the control of the first embodiment, and the upper limit temperature of the shape memorizing alloy coil spring 146 can be set to a lower temperature. Therefore, the degree of temperature drop which should be accomplished for lifting up the shutter plate 143 (i.e., for cooling the shape memorizing alloy coil spring) is reduced so that the time period required for fully opening the opening is further shortened with respect to that obtained in the first and second embodiments, thereby enabling the operation of opening and closing the shutter plate to be rapidly conducted. After the temperature of the shape memorizing alloy coil spring 146 reaches the Af point, the temperature can be maintained to be between the Af point and the Ms point.

According to the second aspect of the invention, a current is supplied to the heater when the shutter plate is to be shut down, and the current supply is stopped when the shutter plate is to be lifted up, whereby the opening and closing characteristics of the damper device is improved as compared with that of a prior art device.

Furthermore, a weak current is always supplied to the heater even in the state where the shutter plate is lifted up (or the shape memorizing alloy coil spring is cooled). Therefore, the shape memorizing alloy coil spring is maintained at a temperature of the R phase transformation or the middle of transformation of the R phase to the M phase. This causes the generated force and degree of distortion of the shape memorizing alloy to be less reduced with respect to the initial values even after the opening and closing operations of 300,000 times or more, resulting in that the durability of the damper device is remarkably enhanced. Moreover, since the current supply to the heater is conducted so that the heater generates heat of the minimum requirement, the responsibility of the opening and closing operation is improved.

Moreover, the duty factor of the heater is reduced after the opening is closed by the shutter plate (i.e., after the shape memorizing alloy coil spring is heated to the Af point or higher). This allows the shape memorizing alloy coil spring to be maintained at a temperature which is higher than the Ms point of the R phase transformation and lower than the Af point. Accordingly, the power consumption of the heater can be reduced, and the temperature drop characteristics in the cooling of the shape memorizing alloy coil spring can be improved as compared with that of the prior art.

Figure 15:
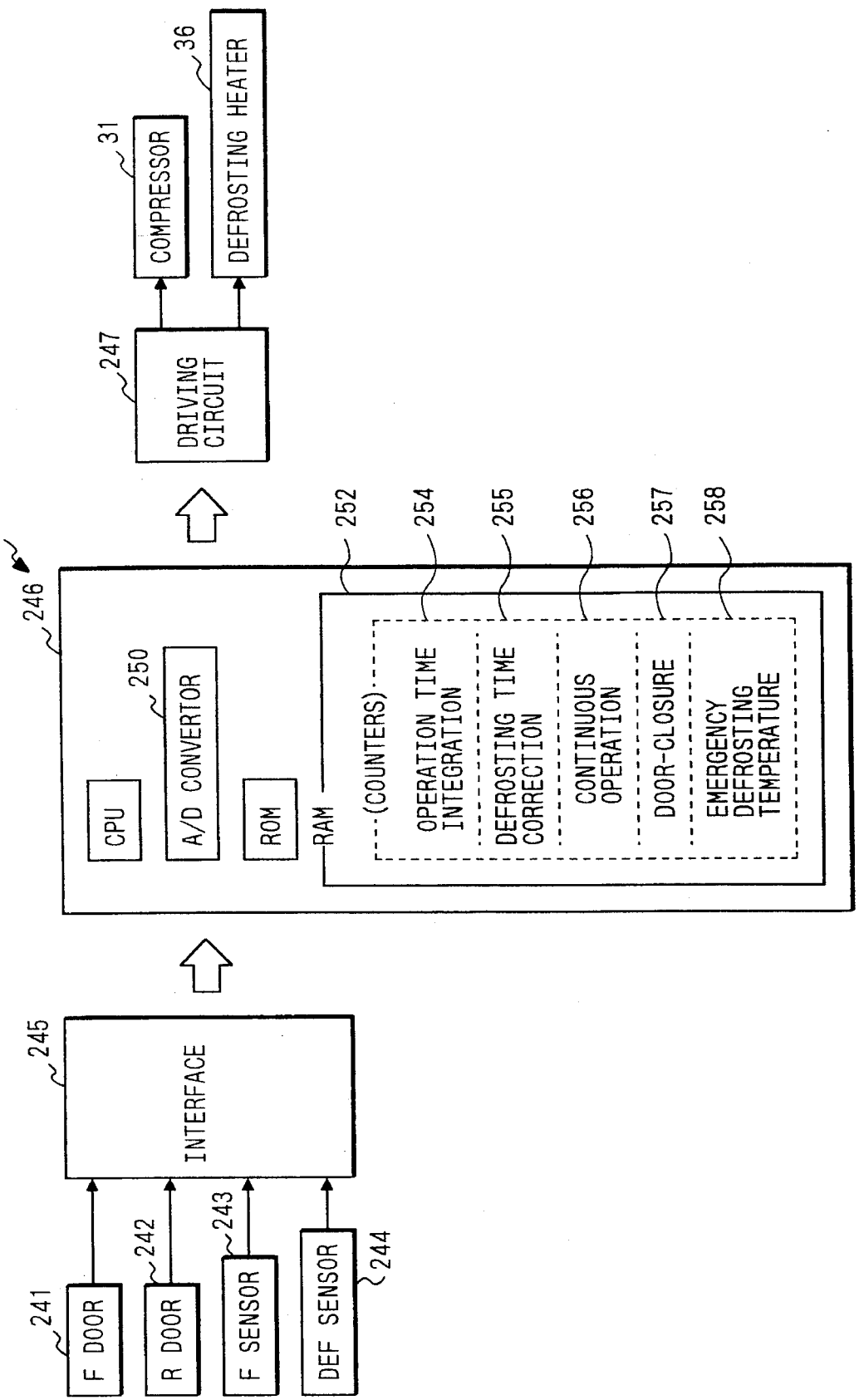
FIG. 15 is a schematic block circuit diagram showing a defrosting control device of the invention.
Figure 16:
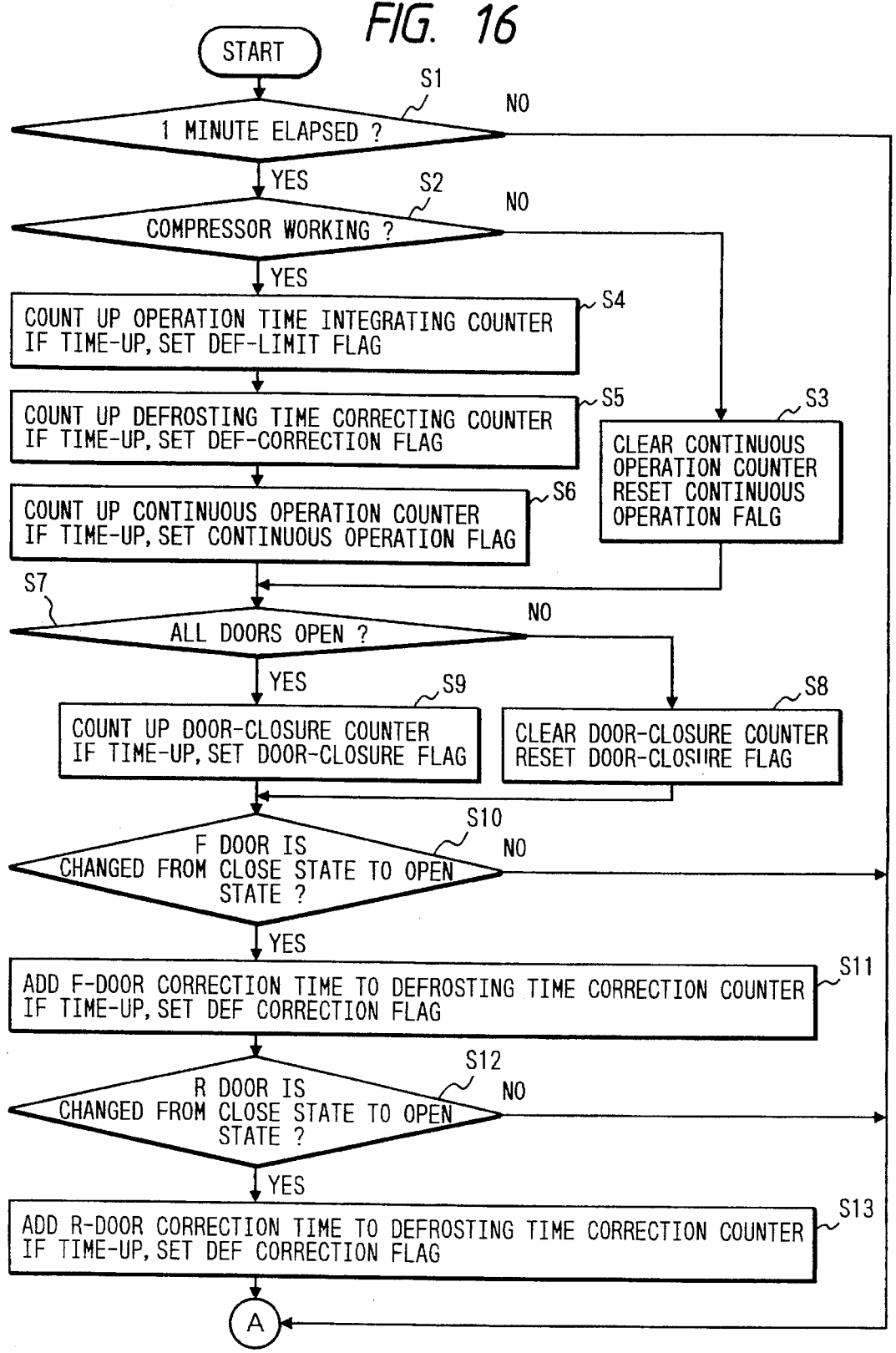
FIG. 16 is a flowchart illustrating a defrosting start timing determining operation of the defrosting control device.
Figure 17:
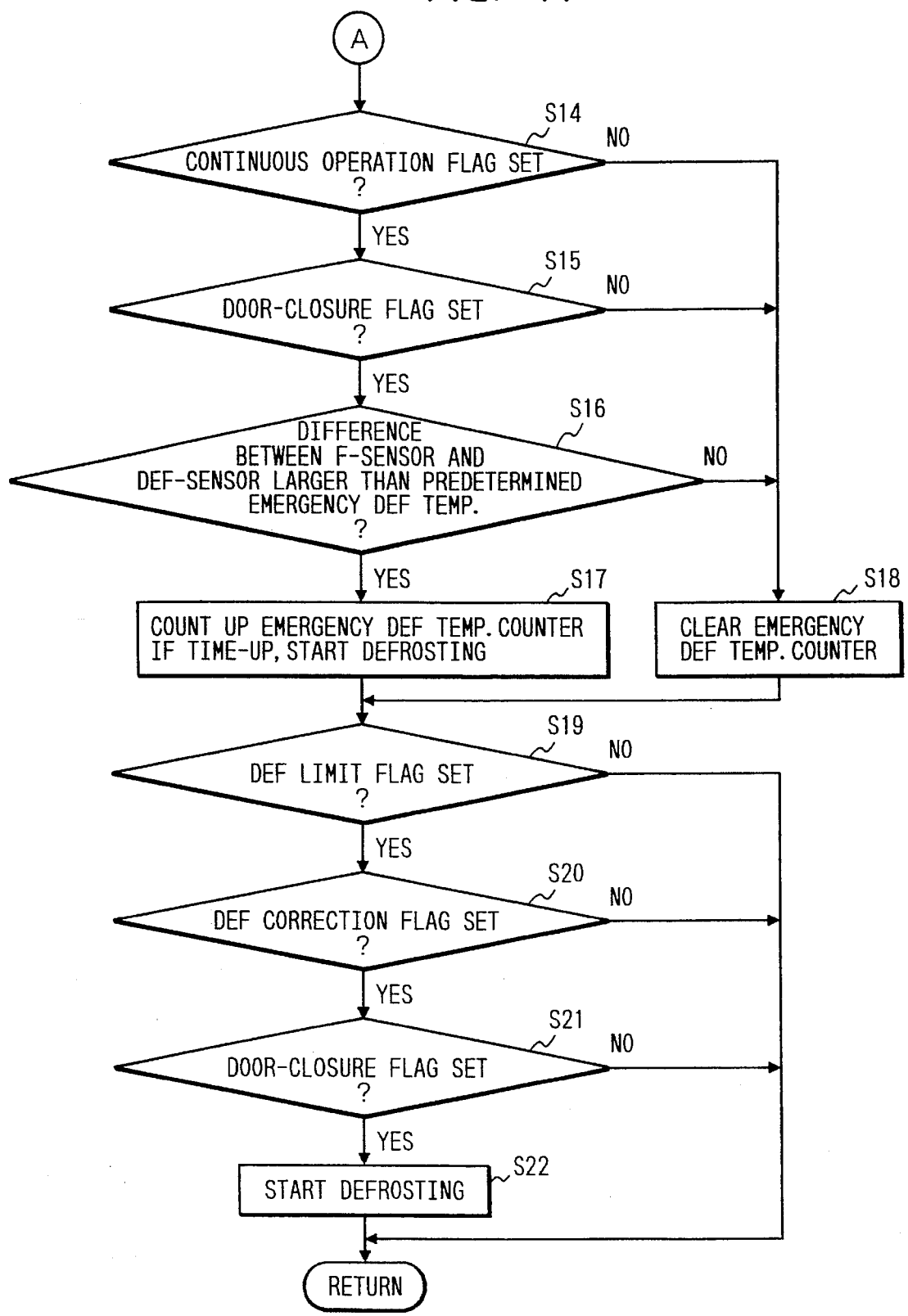
FIG. 17 is a flowchart illustrating a defrosting start timing determining operation of the defrosting control device.

Embodiments of the third aspect of the invention will be described below with reference to FIGS. 15 to 17. FIG. 15 is a block circuit diagram schematically showing the defrosting control device of the invention, and FIGS. 16 and 17 are flowcharts illustrating the operation flow of the defrosting control device for determining the defrosting start timing.

In FIG. 15, reference numeral 241 designates F door open/close detecting means such as a mechanical switch. The detecting means 241 detects the open-to-close change and the close-to-open change of the door 4 of the freezer compartment, and outputs a signal indicative such changes. The reference numeral 242 designates R door open/close detecting means such as a mechanical switch. The detecting means 242 detects the open-to-close change and the close-to-open change of the door 3 of the refrigerating compartment, and outputs a signal indicative such changes. The reference numeral 243 designates a temperature sensing element (hereinafter, referred to as "F sensor") which is disposed in the vicinity of the cold air outlet opening 22A for the freezer compartment 14 and detects the temperature of the freezer compartment. The reference numeral 244 designates a temperature sensing element (hereinafter, referred to as "DEF sensor") which is disposed in the upper portion of the cooler 19 and detects the temperature of the cooler. The reference numeral 246 designates a microcomputer which functions as control means into which data from the F door open/close detecting means 241, the R door open/close detecting means 242, the F sensor 243, and the R sensor 244 are input through an interface 245. In the microcomputer 246, input data are converted by an A/D converter 250 into digital form, and then processed in a prescribed manner. Thereafter, the microcomputer 246 supplies to a driving circuit 247 a signal (data) for driving the compressor, thereby controlling the operation of the compressor 31.

A random access memory (RAM) 252 in the microcomputer 246 is provided with an operation time period integrating counter 254 which integrates the operation time period of the compressor, a defrosting timing correcting counter 255 which converts the open/close frequency of the door into a time period and adds the converted time period to the operation time period of the compressor, a continuous operation counter 256 which measures the continuous operation time period of the compressor, a door-closure counter 257 which measures the time period of the door-closure state, and an emergency defrosting temperature counter 258 which measures the time period of the condition that is judged to be a frosting abnormal condition on the basis of the difference between the temperatures detected by the F sensor 243 and the DEF sensor 244. Every time when a timer of the microcomputer 246 measures one minute, the contents of these counters are incremented. In each of the counters 254 to 258, when the contents thereof reach a predetermined value, it is considered that the time is up.

The microcomputer 246 determines the defrosting start timing on the basis of the obtained data, and controls the electric power supply to the defrosting heater 36.

FIG. 16 is a flowchart illustrating the operation flow for determining the defrosting start timing in the defrosting control device SB of the invention, and will be described in detail. The control for determining the defrosting start timing is started from the state where all the counters are cleared by the power-on operation, or by the termination of the defrosting.

First, if it is determined in step S1 that one minute has elapsed, it is judged in step S2 whether the compressor is in an on state or in an off state. If the compressor is in the off state, the continuous operation counter 256 is cleared in step S3, and a continuous operation flag is reset. Then, the process proceeds to step S7. If the compressor is in the on state, the contents of the operation time period integrating counter 254 are incremented in step S4. If the contents of the counter 254 reach 8 hours, the time is up and a DEF limit flag is set.

Next, in step S5, the contents of the defrosting timing correcting counter 255 are incremented. If the contents of the counter 55 reach 30 hours, the time is up and a DEF correction flag is set. Then, in step S6, the contents of the continuous operation counter 256 are incremented. If the contents of the counter 256 reach 55 minutes, the time is up and a continuous operation flag is set. Then, in step S7, it is judged whether the doors are open or closed, irrespective of the on/off state of the compressor. If all the doors (in the embodiment, both the F door and the R door) are not closed, the door-closure counter 257 is cleared in step S8, and a door-closure flag is reset. Then, the process proceeds to step S10. If all the doors (both the F door and the R door) are closed, the contents of the door-closure counter 257 are incremented in step S9. If the contents of the counter 257 reach 5 minutes, the time is up and the door-closure flag is set.

In step S10, it is judged whether or not the state of the F door is changed from the closed state to the opened state. Only when the F door is changed from the closed state to the opened state, a correction time due to the F door (e.g., 27 minutes) is added to the contents of the defrosting timing correcting counter 255 in step S11. If the contents of the defrosting timing correcting counter 255 reach or exceed 30 hours, the time is up and the DEF correction flag is set.

Next, it is judged in step S12 whether or not the R door is changed from the closed state to the opened state. Only when the R door is changed from the closed state to the opened state, a correction time due to the R door (e.g., 21 minutes) is added to the contents of the defrosting timing correcting counter 255 in step S13. If the contents of the counter 255 reach or exceed 30 hours, the time is up and the DEF correction flag is set.

The microcomputer 246 determines the defrosting start timing on the basis of the above-mentioned various control flags. Hereinafter, the control method (determining method) will be described with reference to FIG. 17.

First, it is judged in step S14 whether or not the continuous operation flag is set. If the flag is set, it is judged in step S15 whether or not the door-closure flag is set. If the flag is set, it is judged in step S16 whether or not the difference between the temperatures detected by the F sensor 243 and the DEF sensor 244 is equal to or larger than a predetermined emergency defrosting temperature (e.g., 12° C.). If the temperature difference is equal to or larger than 12° C., the contents of the emergency defrosting temperature counter 258 are incremented in step S17. If the contents of the counter 258 reach the emergency defrosting start judging time (e.g., 5 minutes), the microcomputer 246 outputs a defrosting start signal (data), so that the operation of the compressor 31 is stopped (turned off) and an electric power is supplied to the defrosting heater 36, thereby starting the defrosting.

As described above, if it is judged in step S17 that an abnormal condition occurs in the refrigerator, the emergency defrosting is started. Therefore, the defrosting start timing is not largely delayed even in such an abnormal condition that the door is left open.

If either of the continuous operation flag and the door-closure flag is reset, or if the difference between the temperatures detected by the F sensor 243 and the DEF sensor 244 does not reach the emergency defrosting temperature, the emergency defrosting temperature counter 258 is cleared in step S18, and the process proceeds to step S19.

Next, it is judged in step S19 whether or not the DEF limit flag is set. If the flag is set, it is judged in step S20 whether or not the DEF correction flag is set. If the flag is set, it is judged in step S21 whether or not the door-closure flag is set. If the door-closure flag is set, the microcomputer 246 outputs a defrosting start signal (data) in step S22, so that the compressor 31 is stopped (turned off) and an electric power is supplied to the defrosting heater 36. Thus, the defrosting is started.

In the configuration described above, the compressor and the air blower start to operate when the power is turned on or when the defrosting is terminated. At this time, the operation time period integrating counter 254 for the compressor starts the counting operation. When the door open/close detecting means 241 and 242 such as mechanical switches detect that any door is opened, the door open/close frequency (in this case, once) is converted into a time period and the time period is added to the time period integrated by the counter 254 (e.g., 27 minutes for the F door, and 21 minutes for the R door), to obtain the corrected defrosting start interval. If the corrected defrosting start interval exceeds a predetermined time period (e.g., 30 hours) and if the time period integrated by the door-closure time integrating counter 257 for integrating the time after all the doors are closed (in the embodiment, both the door of the freezer compartment and the door of the refrigerating compartment) reaches or exceeds a predetermined time period (e.g., 5 minutes), and moreover if the integrated operation time period exceeds a predetermined time period (e.g., 8 hours), the defrosting is started.

In a case where the compressor continuously operates for a predetermined time period (e.g., 55 minutes) or longer, and it is judged that the condition that the temperature of the freezer compartment detected by the temperature sensing element 243 provided in the freezer compartment is higher by a predetermined temperature (e.g., 12° C.) than the temperature of the cooler detected by the temperature sensing element 244 provided in the cooler 19 continues for a predetermined time period (e.g., 5 minutes) or longer, it is judged that a large amount of frost is formed on the cooler and the cooling power is degraded. As a result, the defrosting can be started.

In the above, the embodiment using the adding method has been described. Specifically, the converted time period for each open/close operation of the F door or the R door (27 minutes or 21 minutes) and the elapsed time period are added to the integrated operation time period (8 hours). Alternatively, a subtracting method may be used. In the subtracting method, the converted time period for each open/close operation of the F door or the R door and the elapsed time period are subtracted from the corrected defrosting start interval (30 hours).

As described above, the defrosting start interval is changed depending on the elapsed time period from the closing of the door and the door open/close frequency. Therefore, it is possible to avoid a situation wherein the defrosting is started simultaneously with the opening of the door. In a case where the door open/close frequency is extraordinarily high and hence the defrosting start interval becomes extremely short, moreover, the defrosting start timing can be delayed. Therefore, an erroneous operation such as that the defrosting is started when almost no frost is formed on the cooler can be avoided.

In a case where the cooling power is degraded because of an external factor such as a high humidity condition, a condition where the door is left open, and a condition where food which is not so cold is put in, furthermore, it is judged that an abnormal frost formation has occurred, and the defrosting is immediately started. Accordingly, the degradation of the cooling power is eliminated in an early stage so that an adequate cooling operation is conducted.

As described above, according to the third aspect of the invention, the defrosting start timing is changed in such a manner that the correcting time period obtained on the basis of the door open/close operation is added to the integrated operation time period of the compressor which is counted from the start of the operation of the refrigerator or the termination of the defrosting, to obtain the corrected defrosting corrected interval, and, when the corrected defrosting interval reaches or exceeds a predetermined time period (30 hours), the defrosting start timing is set to the time corresponding to the corrected defrosting interval. When the door open/close frequency is low, that is, when the amount of formed frost is small with respect to the operation time period of the compressor, therefore, the defrosting start timing is delayed so that a waste defrosting is avoided. When the door is frequently opened and closed, it is judged that the amount of formed frost is large with respect to the operation time period of the compressor, and the defrosting start timing is made earlier so that the defrosting is surely conducted. By setting a further condition that the defrosting is stared only when the door-closure state has continued for a predetermined time period (10 minutes) or longer, it is possible to avoid a situation that the defrosting is started simultaneously with the opening of the door. This can prevent the user from having distrustful of the refrigerator. Furthermore, the invention can solve the problem that food in a refrigerator is adversely influenced by the combination of the escape of cold air from the opened door and the stop of the cooling operation.

The defrosting start interval under which the defrosting is surely conducted for the usual door open/close frequency is set as the minimum time period (8 hours). The minimum defrosting start interval is set so that, when the integrated operation time period does not reach or exceed the minimum time period, the defrosting is not started. Accordingly, it is possible to avoid a situation where, when the operation time period of the compressor is short and the door is very frequently opened and closed, the defrosting start timing is determined almost only on the basis of the correcting time due to the door open/close frequency and hence the defrosting start interval becomes extremely short.

If frost is extraordinarily formed on the cooler for a short time period because of a factor such as an extraordinarily high humidity condition, a condition where the door is left open, or a condition where the food which is not so cold is put in, the compressor continues its operation. As a result, the difference between the temperatures detected by the F sensor and the DEF sensor becomes extremely larger. If the temperature difference reaches or exceeds a predetermined value (12° C.) when all the doors are in the closed state, it is judged that the abnormal frost formation occurs, and the emergency defrosting is started. By the emergency defrosting, frost can surely be conducted, and the degradation of the cooling power due to the frost obstruction can be prevented from occurring.

What is claimed is:

1. A refrigerator comprising:

a heat insulating housing having an interior and partitions separating the interior into at least an air cooling chamber and at least one stock compartment;

a defrosting control device for controlling an electric power supply to a defrosting heater;

a cold air duct for guiding cold air from the air cooling chamber to the at least one stock compartment;

a damper device for controlling an inflow of cold air to said cold air duct; and a damper control device for controlling the operation of said damper device, said damper device comprising:

a case having an opening which communicates with said cold air duct;

a shutter plate, rotatably and pivotally supported by said case, for opening and closing said opening;

a bias spring for urging said shutter plate toward the opening direction; and a shape memorizing alloy coil spring on which a heater is wound and which, when heated to the austenite phase transition terminate temperature or higher, is restored to the original shape to cause said shutter plate to close said opening against the urging force of said bias spring, said damper control device supplying a current to said heater in order to cause said shutter plate to close said opening and further supplying at all times a weak current to said heater so as to maintain the temperature of said shape memorizing alloy coil spring at the martensite phase transition start temperature or higher when said shutter plate is in the open state.

2. A refrigerator as claimed in claim 1, wherein said damper control device reduces the duty factor of said heater after said opening is closed by said shutter plate so as to maintain said shape memorizing alloy coil spring at a temperature which is higher than the martensite phase transition start temperature of the R phase transformation and lower than the austenite phase transition terminate temperature.

3. A refrigerator as claimed in claim 1, wherein the heat insulated housing opens at a front and comprises an inner shell, an outer shell, and a foamed heat insulating material filled between said inner and outer shells; two horizontal partitions for dividing the inner space of said heat insulated housing into three stock compartments respectively formed from top to bottom as a refrigerating compartment, a freezer compartment, and a vegetable compartment; a partition plate separated from a portion of said inner shell corresponding to said freezer compartment, said air cooling chamber being formed between said partition plate and said inner shell and containing a cooler, cold air cooled by said cooler being circulated into said refrigerating compartment and said freezer compartment; a projection formed on a back wall of said inner shell corresponding to said freezer compartment and contacting with the back of said partition plate for dividing a space behind said partition plate in two lateral chambers, wherein a space is defined by said projection, said partition plate, and said inner shell to function as a first cold air passage extending between said refrigerating compartment and said vegetable compartment so that cold air in said refrigerating compartment is guided to said vegetable compartment through said cold air passage.

4. A refrigerator as claimed in claim 3, wherein the heat insulated housing includes a rail, formed on a side wall of said inner shell corresponding to said freezer compartment, for supporting an upper container in such a manner that said upper container is movable in the front-to-rear direction, said upper container opening at an upper face; and a small-food container made of metal and detachably placed on said upper container; said upper container being provided at a rear portion with an inlet opening, and at a lower face with an outlet opening, said partition plate being provided at a location opposing said inlet opening with a cold air outlet opening, wherein a second cold air passage is formed by said small-food container and said upper container, said second cold air passage extending from said inlet opening to said outlet opening.

5. A refrigerator as claimed in claim 3, wherein the heat insulated housing includes a rail, formed on a side wall of said inner shell corresponding to said freezer compartment, for supporting an upper container in such a manner that said upper container is movable in the front-to-rear direction, said upper container opening at an upper face; and an ice tray which opens at an upper face and is detachably supported by said upper container; and a lid for closing the opening of said ice tray; said upper container being provided at a rear portion with an inlet opening, and at an upper portion with a finger insertion opening, said partition plate being provided at a location opposing said inlet opening with a cold air outlet opening, wherein a second cold air passage is formed by said ice tray and said upper container, said second cold air passage extending from said inlet opening to said finger insertion opening.

6. A refrigerator as claimed in claim 3, further comprising a drawer type door for closing an opening of said freezer compartment; a lower container disposed behind said door and open at an upper face; a rail formed on a side wall of said inner shell corresponding to said freezer compartment, said rail extending in a front-to-rear direction; and an upper container supported by said rail in such a manner that said upper container is movable in the front-to-rear direction, said upper container opening at an upper face, wherein a projection is formed on a lower face of said upper container, and an engaging portion is formed in an upper portion of said lower container, said engaging portion being engaged with said projection when said door is drawn out by a predetermined distance.

7. A refrigerator as claimed in claim 1, wherein said defrosting control device comprises:

a counter for integrating the operation time period of a compressor; and converting means for converting the open/close frequency of a door into a converted time period;

wherein said control device determines a time at which a defrosting of a cooler is started, on the basis of the operation time period of said compressor integrated by said counter, and the converted time period of the door, and supplies an electric power to said defrosting heater when said operation time period of said compressor reaches or exceeds a predetermined time period.

8. A refrigerator as claimed in claim 1, wherein said defrosting control device comprises:

a counter for integrating the operation time period of a compressor;

converting means for converting the open/close frequency of a door into a converted time period; and a door-closure counter for measuring a time period of a door-closure state;

wherein said defrosting control device determines a time at which a defrosting of a cooler is started, on the basis of the operation time period of said compressor integrated by said counter, and the converted time period, and supplies electric power to said defrosting heater when said door-closure time period measured by said door-closure counter reaches or exceeds a predetermined time period.

9. A refrigerator as claimed in claim 1, comprising a cooler in said cold air duct and wherein said defrosting control device comprises:

a first temperature sensing element disposed in a freezer compartment to detect a temperature of said freezer compartment; and a second temperature sensing element disposed on said cooler to detect a temperature of said cooler;

wherein said defrosting control device turns on and off a compressor on the basis of a signal from a first temperature sensing element, and terminates the defrosting for the cooler on the basis of a signal from second temperature sensing element; and wherein said defrosting control device supplies electric power to a defrosting heater when a difference between temperatures detected by said temperature sensing elements exceeds a predetermined value.

10. A refrigerator as claimed in claim 1, comprising a cooler in said cold air duct and wherein said defrosting control device comprises:

a first temperature sensing element disposed in a freezer compartment to detect a temperature of said freezer compartment;

a second temperature sensing element disposed on said cooler to detect a temperature of said cooler;

a counter for measuring a continuous operation time period of said compressor;

wherein said defrosting control device turns on and off a compressor on the basis of a signal from the first temperature sensing element, and terminates the defrosting for the cooler on the basis of a signal from the second temperature sensing element, and wherein said defrosting control device supplies an electric power to a defrosting heater when the time period measured by said counter reaches or exceeds a predetermined time period and a difference between temperatures detected by first and second said temperature sensing elements exceeds a predetermined value.

11. A refrigerator as claimed in claim 1, comprising a cooler in said cold air duct and wherein said defrosting control device comprises:

a first temperature sensing element disposed in a freezer compartment to detect a temperature of said freezer compartment;

a second temperature sensing element disposed on said cooler to detect a temperature of said cooler;

a continuous operation counter for measuring a continuous operation time period during which said compressor is continuously operated; and a door-closure counter for measuring a time period of a door-closure state;

wherein said defrosting control device turns on and off a compressor on the basis of a signal from the first temperature sensing element, and terminates the defrosting for the cooler on the basis of a signal from the second temperature sensing element, and wherein said defrosting control device supplies an electric power to a defrosting heater when the continuous operation time period measured by said-continuous operation counter reaches or exceeds a predetermined time period, the time period measured by said door-closure counter reaches or exceeds a predetermined time period, and a difference between temperatures detected by said temperature sensing elements exceeds a predetermined value.

* * * * *